US012747582B2

(12) United States Patent
Hohlfeld et al.

(10) Patent No.: US 12,747,582 B2
(45) Date of Patent: Sep. 29, 2026

(54) JOINT-SEALING STRIP

(71) Applicant: Hanno Werk GmbH & Co. KG, Laatzen (DE)

(72) Inventors: Andreas Hohlfeld, Springe (DE); Tobias Koplin, Hannover (DE)

(73) Assignee: Hanno Werk GmbH & Co. KG, Laatzen (DE)

( * ) Notice: Subject to any disclaimer, the term of this patent is extended or adjusted under 35 U.S.C. 154(b) by 0 days.

(21) Appl. No.: 18/971,855

(22) Filed: Dec. 6, 2024

(65) Prior Publication Data

US 2025/0207387 A1 Jun. 26, 2025

(51) Int. Cl.

*E04B 1/68* (2006.01)
*E04B 1/94* (2006.01)
*F16J 15/10* (2006.01)

(52) U.S. Cl.

CPC ............ *E04B 1/6812* (2013.01); *E04B 1/948* (2013.01); *F16J 15/104* (2013.01)

(58) Field of Classification Search

CPC ........ E04B 1/6812; E04B 1/948; F16J 15/104
See application file for complete search history.

(56) References Cited

U.S. PATENT DOCUMENTS 3,334,557 A * 8/1967 Fitzgibbon ............ E01C 11/103 521/918
4,181,711 A * 1/1980 Ohashi .................. E04B 1/6812 428/95
4,401,716 A * 8/1983 Tschudin-Mahrer ........................ E04B 1/6812 428/319.7
4,564,550 A * 1/1986 Tschudin-Mahrer .... C09K 3/10 428/317.1
4,767,655 A * 8/1988 Tschudin-Mahrer ..... E04B 1/68 428/317.1
4,839,223 A * 6/1989 Tschudin-Mahrer ... E04B 1/948 428/317.1
5,000,813 A * 3/1991 Hill ............................ C08J 9/40 521/184

(Continued)

FOREIGN PATENT DOCUMENTS

AT 511380 B1 * 1/2016 ........... E06B 3/6202
DE 1 000 946 B 1/1957

(Continued)

OTHER PUBLICATIONS

DIN 4102-1, May 1998, total of 29 pages, including a concise explanation of the relevance in English.

(Continued)

*Primary Examiner* — Eugene G Byrd
(74) *Attorney, Agent, or Firm* — Collard & Roe, P.C.

(57) ABSTRACT

A joint-sealing strip includes a foam material, having two longitudinal sides as well as a top side that borders on the one joint flank in the installed state of the joint-sealing strip, and an underside that borders on the opposite joint flank in the installed state of the joint-sealing strip, wherein the foam material has an outer fire-protection layer over a predetermined region, which layer has an intumescent material, and/or an inner fire-protection layer over a predetermined region, which layer has an intumescent material, and/or wherein the foam material is a foam material that has been foamed with an intumescent material.

17 Claims, 10 Drawing Sheets

(56) References Cited

U.S. PATENT DOCUMENTS

| | | | | | |
|---|---|---|---|---|---|
| 5,130,176 | A * | 7/1992 | Baerveldt | B32B 7/12 | 428/317.1 |
| 5,935,695 | A * | 8/1999 | Baerveldt | B32B 5/18 | 428/317.1 |
| 6,685,196 | B1 * | 2/2004 | Baerveldt | E04B 1/6812 | 277/654 |
| 9,200,437 | B1 * | 12/2015 | Hensley | E04B 1/6812 | |
| 9,404,581 | B1 * | 8/2016 | Robinson | F16J 15/104 | |
| 9,732,853 | B2 * | 8/2017 | Kethorn | E06B 1/64 | |
| 10,081,939 | B1 | 9/2018 | Robinson | | |
| 11,326,311 | B2 * | 5/2022 | Robinson | E04B 1/6801 | |
| 11,499,640 | B1 * | 11/2022 | Fiorilla | F16J 15/022 | |
| 2005/0126848 | A1 * | 6/2005 | Siavoshai | B60R 13/0815 | 181/290 |
| 2008/0268231 | A1 * | 10/2008 | Deib | E04B 1/6812 | 428/323 |
| 2009/0246498 | A1 * | 10/2009 | Deiss | E04B 1/68 | 428/220 |
| 2012/0326391 | A1 * | 12/2012 | Hirose | F16J 15/102 | 277/637 |
| 2018/0148922 | A1 * | 5/2018 | Robinson | E04B 1/948 | |
| 2019/0063608 | A1 | 2/2019 | Robinson et al. | | |
| 2023/0272614 | A1 * | 8/2023 | Fiorilla | B32B 7/05 | 428/160 |

FOREIGN PATENT DOCUMENTS

| | | | | | |
|---|---|---|---|---|---|
| DE | 34 07 995 | A1 | | 9/1985 | |
| DE | 40 20 230 | A1 | | 1/1991 | |
| DE | 196 41 415 | C2 | | 9/1999 | |
| DE | 200 09 674 | U1 | | 9/2000 | |
| DE | 20 2012 104 826 | U1 | | 3/2014 | |
| EP | 1 323 670 | A2 | | 7/2003 | |
| EP | 1 811 111 | A2 | | 7/2007 | |
| EP | 2 065 548 | A2 | | 6/2009 | |
| EP | 2 107 176 | A1 | | 10/2009 | |
| EP | 2 112 292 | A2 | | 10/2009 | |
| EP | 2 354 410 | A2 | | 8/2011 | |
| EP | 2 415 942 | A1 | | 2/2012 | |
| EP | 2 420 631 | A2 | | 2/2012 | |
| EP | 2 784 231 | A1 | | 10/2014 | |
| EP | 2 655 775 | B1 | | 1/2015 | |
| EP | 2 982 821 | A1 | | 2/2016 | |
| EP | 2 990 551 | A1 | | 3/2016 | |
| EP | 2 990 552 | A1 | | 3/2016 | |
| EP | 2 990 553 | A1 | | 3/2016 | |
| EP | 2 990 575 | A1 | | 3/2016 | |
| EP | 3 150 366 | A1 | | 4/2017 | |
| EP | 3 375 597 | A2 | | 9/2018 | |
| EP | 3 404 156 | A1 | | 11/2018 | |
| EP | 3 567 174 | A1 | | 11/2019 | |
| EP | 3 567 175 | A1 | | 11/2019 | |
| EP | 3 567 176 | A1 | | 11/2019 | |
| EP | 3 567 177 | A1 | | 11/2019 | |
| EP | 3 603 941 | A1 | | 2/2020 | |
| EP | 3 608 482 | A1 | | 2/2020 | |
| EP | 3 851 625 | A1 | | 7/2021 | |
| EP | 4575114 | A1 | * | 6/2025 | F16J 15/104 |
| WO | 94/20701 | A1 | | 9/1994 | |
| WO | 2004/054800 | A1 | | 7/2004 | |
| WO | 2009/043758 | A1 | | 4/2009 | |
| WO | 2009/138311 | A1 | | 11/2009 | |
| WO | 2012/167762 | A1 | | 12/2012 | |
| WO | 2015/054716 | A1 | | 4/2015 | |

OTHER PUBLICATIONS

DIN 4102-2, Sep. 1977, total of 11 pages, including a concise explanation of the relevance in English.

DIN EN 13501-1, May 2019 (= EN 13501-1), total of 63 pages, including a concise explanation of the relevance in English.

DIN EN 13501-2, Dec. 2016 (= EN 13501-2), total of 85 pages, including a concise explanation of the relevance in English.

European Search Report dated Jun. 11, 2024 in European Application No. 23219740.0, with English translation of the relevant parts.

* cited by examiner

JOINT-SEALING STRIP

CROSS REFERENCE TO RELATED APPLICATIONS

Applicant claims priority under 35 U.S.C. § 119 of European Application No. 23 219 740.0 filed Dec. 22, 2023, the disclosure of which is incorporated by reference.

BACKGROUND OF THE INVENTION

1. Field of the Invention

The invention relates to a joint-sealing strip comprising a foam material having two longitudinal sides as well as a top side that borders on the one joint flank in the installed state of the joint-sealing strip, and an underside that borders on the opposite joint flank in the installed state of the joint-sealing strip.

2. Description of the Related Art

Compressible joint-sealing strips that have a foam material, for providing a seal against air drafts and driving rain are known, for example, from DE 196 41 415 C2, DE 200 09 674 U1 or WO 2012/167762 A1, and are used in construction technology to seal building components, in particular, for example, window and door frames with regard to a masonry wall, for example a building opening or an expansion joint in a facade. The aforementioned joint-sealing strips have at least one barrier layer or membrane layer. Further joint-sealing strips that do not have a barrier layer or membrane layer are known, for example, from DE 1 000 946 B, DE 40 20 230 A1 or DE 34 07 995 A1.

A known joint-sealing strip, which comprises a foam material, has two longitudinal sides as well as a top side that borders on the one joint flank, in particular of a masonry wall, in the installed state of the joint-sealing strip, and an underside that borders on the opposite joint flank, in particular of the building component, in the installed state of the joint-sealing strip. One or preferably more membrane layers can run between the top side and the underside, in particular parallel or almost parallel to the longitudinal sides, in the longitudinal direction, in each instance. In a known manner, the underside of such a joint-sealing strip is glued onto the building component to be sealed off, for example a window frame and a door frame. After installation of the building component, for example into a building opening, the previously compressed joint-sealing strip expands, in other words it undergoes elastic recovery, so that the top side of the joint-sealing strip borders on or lies against the masonry of the building wall opening, and thus seals the building component at the masonry of the building wall opening. Joint-sealing strips of this type are introduced, for sealing purposes, also into facade joints, in particular into existing joints.

SUMMARY OF THE INVENTION

Proceeding from this state of the art, the invention is based on the task of improving such joint-sealing strips, but also components of them, in particular with regard to fire protection, and also of making available an improved method for the production of such joint-sealing strips.

This task is accomplished by means of a joint-sealing strip having the characteristics of one aspect of the invention, as well as by means of a method for the production of a joint-sealing strip, having the characteristics of another aspect of the invention. Further developments and advantageous embodiments of the invention are evident from the dependent claims, in each instance.

The joint-sealing strip according to the invention comprises a foam material and has two outer sides, namely two longitudinal sides, as well as an outer side that borders on the one joint flank in the installed state of the joint-sealing strip, namely a top side, and an outer side that borders on the opposite joint flank in the installed state of the joint-sealing strip, namely an underside. Such a joint-sealing strip is characterized, according to the invention, in that the foam material has an outer fire-protection layer over a predetermined region, which layer has an intumescent material, and/or an inner fire-protection layer over a predetermined region, which layer has an intumescent material, and/or that the foam material is a foam material that has been foamed with an intumescent material.

Exfoliated graphite, which is also called expandable graphite, can preferably be used as the intumescent material, which can also be referred to as an intumescent. Expandable graphite advantageously releases gases as the result of the heat effect that occurs due to a fire. When the foam material of the joint-sealing strip turns to ash, a foamed ash body forms as the gas forms, and this body hinders the oxygen supply and thereby the spread of flames. The ash body can form a layer, for example.

Intumescent material generally reacts to temperature increases and protects the joint that has been provided with the joint-sealing strip, in the event of a fire, to prevent fire or smoke gas from passing through. In this regard, the intumescent material starts to foam above a specific temperature, usually at temperatures between 120° C. and 200° C., and thereby a heat-insulating, insulating foam body is formed, which protects against the effect of the fire. The foam body is voluminous as well as carbonaceous, it insulates building components that lie underneath it, i.e. their surfaces, and accordingly protects against an undesirable introduction of heat.

It can be advantageous if expandable graphite can be used as the intumescent material. The expandable graphite that can be used can consist of one type of expandable graphite or of a mixture of several, preferably two expandable graphite types.

It can be advantageous if the expandable graphite has an activation temperature of >140° C., preferably of >180° C., particularly preferably of >180° C. to <220° C.

An activation temperature, which can also be referred to as an onset temperature, expansion temperature or starting temperature, is understood to be a temperature at which the expandable graphite starts to expand to a multiple of its original volume. In particular, the starting temperature can be determined as disclosed in EP 1 323 670 A2.

It can be advantageous if the expandable graphite has an expansion volume, at preferably 1000° C., of >50 $cm^3/g$, preferably of >100 $cm^3/g$, particularly preferably of >200 $cm^3/g$.

To determine the expansion volume, as is disclosed, in particular, in WO 2009/043758 A1, preferably a quartz container is heated to 1000° C. in an electric melting furnace, 2 g of the expandable graphite are quickly introduced into the quartz container, and the container is left in the melting furnace for 10 sec, and subsequently the resulting volume is determined.

It can be advantageous if the expandable graphite consists of one of the following expandable graphite types or of a mixture of several, preferably two of the following expandable graphite types, namely a) an expandable graphite type in which at least 50%, preferably at least 75% or at least 90% of the particles have a particle size of >180 μm, or
b) an expandable graphite type in which at least 50%, preferably at least 75% or at least 80% of the particles have a particle size of <180 μm, or
c) an expandable graphite type in which at least 50%, preferably at least 75% or at least 80% of the particles have a particle size of <150 μm, or
d) an expandable graphite type in which at least 50%, preferably at least 75% or at least 80% of the particles have a particle size of <75 μm, or
e) an expandable graphite type in which at least 50%, preferably at least 70% or at least 80% of the particles have a particle size of >300 μm, or
f) an expandable graphite type in which at least 50%, preferably at least 70% or at least 80% of the particles have a particle size of >500 μm.

It can be advantageous if the expandable graphite consists of a mixture of at least two of the following expandable graphite types, namely a) an expandable graphite type in which at least 50%, preferably at least 60% of the particles have a particle size of >180 μm, or
b) an expandable graphite type in which at least 50%, preferably at least 60% of the particles have a particle size <150 μm, or
c) an expandable graphite type in which at least 50%, preferably at least 60% of the particles have a particle size of >300 μm.

The following expandable graphite types have proven to be particularly suitable.

It can be advantageous if an expandable graphite type A having the following properties is used as the expandable graphite:

Particle size: at least 75% of the particles have a particle size of >180 μm
Activation or starting temperature: 180-220° C.
Expansion volume or expansion rate at 1000° C.: at least 250 $cm^3/g$ It can be advantageous if an expandable graphite type B having the following properties is used as the expandable graphite:

Particle size: at least 80% of the particles have a particle size of <150 μm
Activation or starting temperature: 180-220° C.
Expansion volume or expansion rate at 1000° C.: at least 100 $cm^3/g$ It can be advantageous if an expandable graphite type C having the following properties is used as the expandable graphite:

Particle size: at least 70% of the particles have a particle size of >300 μm
Activation or starting temperature: 180-220° C.
Expansion volume or expansion rate at 1000° C.: at least 250 $cm^3/g$ It can be advantageous if a mixture of the expandable graphite types A and B is used as the expandable graphite, preferably in a ratio of 2:1 to 1:2.

It can be advantageous if a mixture of the expandable graphite types B and C is used as the expandable graphite, in a ratio of 2:1 to 1:2.

For certain cases of use, it can be advantageous if an expandable graphite type D having the following properties is used as the expandable graphite:

Particle size: approximately 85% of the particles have a particle size of <75 μm
Activation or starting temperature: 190-210° C.
Expansion volume or expansion rate at 1000° C.: at least 40 $cm^3/g$ For certain cases of use, it can be advantageous if an expandable graphite type E having the following properties is used as the expandable graphite:

Particle size: at least 85% of the particles have a particle size of <180 μm
Activation or starting temperature: 190-210° C.
Expansion volume or expansion rate at 1000° C.: at least 100 $cm^3/g$ For some cases of use, it can be advantageous if an expandable graphite type F having the following properties is used as the expandable graphite:

Particle size: at least 90% of the particles have a particle size of >180 μm
Activation or starting temperature: 170-190° C.
Expansion volume or expansion rate at 1000° C.: at least 320 $cm^3/g$ For other cases of use, it can be advantageous if an expandable graphite type G having the following properties is used as the expandable graphite:

Particle size: at least 80% of the particles have a particle size of >300 μm
Activation or starting temperature: 170-190° C.
Expansion volume or expansion rate at 1000° C.: at least 360 $cm^3/g$ For a few cases of use it can be advantageous if an expandable graphite type H having the following properties is used as the expandable graphite:

Particle size: at least 90% of the particles have a particle size of >500 μm
Activation or starting temperature: 130-150° C.
Expansion volume or expansion rate at 1000° C.: at least 600 $cm^3/g$ For different purposes of use, it can be advantageous to mix several, preferably two of the aforementioned expandable graphite types.

The particle size is determined by means of screening or sifting, so as to determine the proportion of the particles that are "smaller than" or "larger than" a defined screen size (mesh). In this regard, the particle size does not necessarily correspond to the screen size. The conversion of mesh to micrometers takes place by way of tables known to a person skilled in the art.

It can be advantageous if the mixture ratio of two expandable graphite types amounts to ≥1:9 to ≤9:1.

It can be advantageous if the expandable graphite is composed of 10-90 wt.-% of a first expandable graphite type and 10-90 wt.-% of a second expandable graphite type, wherein the sum of the two expandable graphite types totals 100 wt.-%, with reference to the composition.

It can be advantageous if the expandable graphite is composed of 10-90 wt.-% of a first expandable graphite type, 10-90 wt.-% of a second expandable graphite type, and 10-90 wt.-% of a third expandable graphite type, wherein the sum of the three expandable graphite types totals 100 wt.-%, with reference to the composition.

An outer fire-protection layer is understood to be a layer that is arranged on one or more than one outer side of the foam material. A predetermined region should be understood to mean that it is advantageous even if only part of one or more than one outer side of the foam material can have the outer fire-protection layer or that it is also advantageous if one or more than one outer side of the foam material is completely provided with the outer fire-protection layer.

An inner fire-protection layer is understood to be a layer that is arranged in the foam material. A predetermined region should be understood to mean that such an inner fire-protection layer runs from one outer side to the other outer side or from one edge to another edge within the foam material, and then quasi divides the foam material into sections, or that such an inner fire-protection layer specifically does not run from one outer side to the other outer side or from one edge to another edge. In the case last mentioned, it can therefore be true that the inner fire-protection layer does not end at any outer side or edge of the foam material, but rather is arranged freely within the foam material, or that the inner fire-protection layer borders on an outer side or edge of the foam material only with one end, or borders with both ends on one and the same outer side or edge of the foam material. If the inner fire-protection layer borders on one and the same outer side of the foam material with both ends, the foam material is quasi also divided into sections.

Preferably, an elastic soft polyurethane foam, which was produced from a foam material reaction mixture having a polyol as a reaction component and a polyisocyanate as a further reaction component, as well as a proportion of expandable graphite, preferably in flake form, into which at least one reaction component was mixed, can be used as a foam material foamed with an intumescent material. The intumescent material is therefore already added to at least one of the reaction components in the foaming process.

It can be advantageous if the outer fire-protection layer is arranged on the longitudinal side of the foam material that faces the exterior in the installed state of the joint-sealing strip and/or on the longitudinal side of the foam material that faces the interior in the installed state of the joint-sealing strip and/or on the top side of the foam material and/or on the underside of the foam material.

Therefore, different combinations of the outer fire-protection layer are possible, each being according to the invention in and of themselves. Each combination can be advantageous, in this regard, depending on the purpose of use or the dimensions of the joint-sealing strip. A variant in which the outer fire-protection layer and/or the inner fire-protection layer is/are arranged closer to the exterior than to the interior is predominantly advantageous.

It can be advantageous if at least one inner fire-protection layer extends parallel to the longitudinal sides, within the foam material, and/or if at least one inner fire-protection layer extends parallel to the top side and the underside, within the foam material, and/or if at least one inner fire-protection layer extends at a slant between the top side and the underside, within the foam material, and/or if at least one inner fire-protection layer extends at a slant between the longitudinal sides, within the foam material.

Each arrangement or combination mentioned above can be advantageous in and of itself, depending on the use or dimensioning of the joint-sealing strip.

It can be advantageous if at least one inner fire-protection layer is arranged centrally within the foam material and/or if at least one inner fire-protection layer is arranged decentrally within the foam material.

Each arrangement or combination mentioned above can be advantageous in and of itself, depending on the use or dimensioning of the joint-sealing strip.

It can be advantageous if at least one inner fire-protection layer extends in a curve between the top side and the underside, within the foam material, and/or if at least one inner fire-protection layer extends in a curve between the longitudinal sides, within the foam material.

Curved inner fire-protection layers can advantageously be structured in such a manner that in the event of a fire, a foamed ash body that spreads in a specific direction is formed along with the gas formation.

It can be advantageous if the outer fire-protection layer and/or the inner fire-protection layer is/are a film into which the intumescent material is integrated, wherein the film is preferably equipped to be adhesive on one or both sides.

Suitable films in the form of hybrid film systems, in which at least one film is coated with intumescent material, or in the form of fire-protection films are disclosed, for example, in WO 2004/054800 A1.

The film itself can advantageously also consist of an intumescent material. This material is, in particular, graphite films composed of expandable graphite.

Such films can be arranged in or on the foam material, for example using methods as they are disclosed in EP 3 567 176 A1, EP 3 567 175 A1, EP 3 567 177 A1, EP 3 567 174 A1, EP 2 990 553 A1, EP 2 990 552 A1, EP 2 990 551 A1, EP 3 608 482 A1, EP 3 375 597 A2, EP 3 150 366 A1, EP 3 404 156 A1, EP 3 851 625 A1 or EP 3 603 941 A1. In this regard, the films can be applied before a compression of the joint-sealing takes place and subsequently be compressed, together with the foam material, to produce a compressed joint-sealing strip roll.

It can be advantageous if the outer fire-protection layer that has the intumescent material and/or the inner fire-protection layer that has the intumescent material contain(s) a binder.

The binder having the intumescent material, preferably expandable graphite, can advantageously have the consistency of a paste with which the foam material is coated. For this purpose, a person skilled in the art knows various coating methods, for example by means of a scraper. Such a paste can advantageously be applied to a longitudinal side as the outer side of a previously compressed joint-sealing strip that has been wound up into a roll, for example it can be spread on and subsequently dried. The resulting continuous layer, in other words one that has no gaps, breaks up during expansion of the joint-sealing strip in the joint, so that gaps form in the outer fire-protection layer, but these do not negatively influence the desired function of fire protection.

For certain joint-sealing strips, however, it can also be advantageous to apply an outer fire-protection layer and/or an inner fire-protection layer as a binder with the intumescent material, before compression of the foam material, and only afterwards to compress the joint-sealing strip and wind it up into a roll. For this purpose, the aforementioned methods for production of individual disks of joint-sealing strips, for example, are good possibilities. In the case of an inner fire-protection layer, it is advantageous that a hot-melt glue can be used in a simple manner, which glue contains the intumescent material.

In the case of the outer fire-protection layer and/or the inner fire-protection layer, it can be advantageous if the intumescent material is provided, in particular, with epoxy resin, alkyd resin, acrylic resin, silicone resin and/or silicone/epoxy hybrid resin as a binder polymer.

It can be advantageous if at least one outer fire-protection layer makes a transition into at least one inner fire-protection layer.

It can be advantageous if the outer fire-protection layer and/or the inner fire-protection layer is/are composed, in each instance, of a cohesive surface, with or without gaps, and/or of multiple non-cohesive surfaces, with or without gaps.

Very generally, it can be advantageous if the outer fire-protection layer is applied as a continuous outer fire-protection layer, in other words one not having any gaps, partially or preferably completely on at least one longitudinal side of the joint-sealing strip, which was previously compressed and preferably previously wound up into a roll, in such a manner that this outer fire-protection layer breaks up in a joint during expansion of the joint-sealing strip, so that gaps have finally formed in the previously cohesive surface, without gaps, of the outer fire-protection layer, in the installed state of the joint-sealing strip.

It can be advantageous if the proportion of gaps on the surface that has been provided, in total, with an outer fire-protection layer, amounts to 10 to 90%, preferably 70 to 80%, after partial or complete expansion of the joint-sealing strip.

It can be advantageous if the foam material has at least one moisture-variable outer membrane layer over a predetermined region and/or at least one moisture-variable inner membrane layer over a predetermined region, wherein the outer membrane layer and/or the inner membrane layer is/are arranged, at least in part, transverse to a water vapor diffusion direction.

Suitable moisture-variable membrane layers are known to a person skilled in the art, for example from EP 2 655 775 A1.

It can be advantageous if the outer fire-protection layer is composed in such a manner that it also forms the moisture-variable outer membrane layer, and/or if the inner fire-protection layer is composed in such a manner that it also forms the moisture-variable inner membrane layer. However, variants in which the moisture-variable membranes do not take on any fire-protection function are preferred.

It can be advantageous if the foam material is impregnated with an impregnation compound.

Methods for impregnation of a foam material with an impregnation compound are known to a person skilled in the art. Usually, the impregnation serves the purpose of configuring the joint-sealing strip that comprises the foam material with a delayed recovery behavior. Furthermore, the joint-sealing strip that has the foam material can be equipped with further functionalities, in particular a water-repellent effect, an air seal, a color or a UV protection, by means of the impregnation with an impregnation compound.

It can be advantageous if the impregnation compound comprises a binder, preferably an aqueous dispersion on the basis of an acrylic acid ester, particularly preferably an aqueous dispersion of a polyacrylic acid butyl ester.

For some uses, it can also be advantageous if the impregnation compound comprises a binder on a polyurethane basis.

For certain uses, it can also be advantageous if the impregnation compound comprises a binder on a wax basis.

For specific uses, it can also be advantageous if the impregnation compound comprises a binder on a bitumen basis.

By means of the impregnation, the density of the impregnated foam material, after it dries, is increased in comparison with a non-impregnated foam material.

Usually, the foam material is saturated with an impregnation compound, in that the foam material is immersed in the impregnation compound, so that the impregnation compound, preferably with the aid of immersion rollers or squeezing rollers, penetrates into the pores of the foam material and penetrates through the material completely. In other words, the impregnation compound completely fills the pores of the foam material. Preferably, an open-pore foam material is used for this purpose. After impregnation, the foam material is rolled by means of at least one roller, in particular with a pair of rollers. By means of the at least one roller, part of the impregnation compound is squeezed out of or off the foam material, up to the desired degree of impregnation. By means of variation of the roller pressure, the degree of impregnation, in the present case, that is, in particular the amount of the intumescent material taken up by the foam material, can be varied. Subsequently, the foam material is dried and cut.

It can be advantageous if the impregnation compound contains an intumescent material.

The impregnation compound is preferably a solution or dispersion with the intumescent material. This solution or dispersion can also contain known fillers and/or additives in addition to the intumescent material.

As has already been mentioned, it can be advantageous if the foam material, in addition to the impregnation with an outer fire-protection layer, is coated in one or more layers over a predetermined region and/or provided with at least one inner fire-protection layer over a predetermined region.

It is also possible to impregnate or coat the foam material under pressure or in a vacuum or using a spray device.

It can also be advantageous if the foam material has an impregnation that has an intumescent material, over a predetermined region. This can be a region that helps to form at least one outer side of the joint-sealing strip or borders on it, and/or this can be a region that is arranged within the foam material. In other words, the impregnation can be carried out in such a manner that quasi at least one outer fire-protection layer and/or at least one inner fire-protection layer is/are formed.

The invention furthermore relates to a method for the production of a joint-sealing strip, which comprises a foam material having two longitudinal sides as well as a top side that borders on the one joint flank in the installed state of the joint-sealing strip, and an underside that borders on the opposite joint flank in the installed state of the joint-sealing strip, wherein the foam material is coated, over a predetermined region, with an outer fire-protection layer that has an intumescent material, in that a paste, which contains a binder and the intumescent material, preferably expandable graphite, is applied, at least in certain regions, to the one and/or the other longitudinal side and/or top side and/or underside of the non-compressed or of the compressed foam material, and subsequently dried.

It can be advantageous if the intumescent material is homogeneously distributed in and on the foam material of the joint-sealing strip. However, for some cases of use, it can also be advantageous if the intumescent material is non-homogeneously distributed in and on the foam material, in particular over the width and/or over the height of the joint-sealing strip.

It can be advantageous if the type and amount of the intumescent material used is selected in such a manner that the joint-sealing strip that comprises the foam material corresponds to at least one of the common fire standards for the construction sector in its indicated area of use, for example DIN 4102-B1 and/or DIN 4102-B2 and/or DIN 4102-≥F30 and/or EN13501 Class E to B and/or EN 13501>R30 or >EI30.

It can be advantageous if the type and amount of the intumescent material used is selected in such a manner that an increase in the fire-protection classification of at least one of the common fire standards for the construction sector comes about. Thus, in particular, it can be advantageous if, for example, a joint-sealing strip in Construction Materials Class B2 according to DIN 4102-1 or Class E DIN EN 13501-1 meets the requirements of one of the higher Construction Materials Classes B1 according to DIN 4102-1 or D to B according to EN 13501-1, by means of the intumescent layer. It can also be advantageous, in particular, if the fire resistance capacity according to DIN 4102-2 or EN 13501-2 of a lower fire-resistance class, for example F30 according to DIN 4102-2 or EI30 according to EN 13501-2, is improved to fire-resistance class >F60 according to DIN 4102-2, or >EI 60 according to EN 13501-1, for example, by means of the intumescent layer.

It can be advantageous if the foam material is open-celled or at least partially open-celled.

It can be advantageous if the foam material is a soft foam.

It can be advantageous if the foam material is a polyurethane foam material.

It can be advantageous if the foam material is capable of recovery.

It can be advantageous if the foam material is capable of recovery with a delay after impregnation.

For some cases, it can also be advantageous if the foam material is not impregnated.

It can be advantageous if the foam material is a reticulated polyurethane foam material.

It can be advantageous if at least one foam material, foam material section or foam material element of a joint-sealing strip, as it is the object of WO 2012/167762 A1, is equipped, according to the invention, with the intumescent material. The disclosure content of WO 2012/167762 A1 is incorporated into this application, by means of an explicit reference, as belonging to the object of the present application.

It can be advantageous if at least one foam material, foam material section or foam material element of a joint-sealing strip, as it is the object of DE 196 41 415 A1 or DE 200 09 674 U1, is equipped, according to the invention, with the intumescent material. The disclosure content of DE 196 41 415 A1 and of DE 200 09 674 U1 is incorporated into this application, by means of an explicit reference, as belonging to the object of the present application.

It can be advantageous if at least one foam material, foam material section or additional foam material or foam material strip of a joint-sealing strip, as it is the object of EP 1 811 111 A2, is equipped, according to the invention, with the intumescent material. The disclosure content of EP 1 811 111 A2 is incorporated into this application, by means of an explicit reference, as belonging to the object of the present application. It can be particularly advantageous if at least one of the sides mentioned in EP 1 811 111 A2, in particular at least a narrow side of a joint-sealing strip is coated with the intumescent material.

It can be advantageous if at least one foam material, foam material section or foam material element of a profiled joint-sealing strip, as it is the object of WO 2009/138311 A1, is equipped, according to the invention, with the intumescent material. The disclosure content of WO 2009/138311 A1 is incorporated into this application, by means of an explicit reference, as belonging to the object of the present application.

It can be advantageous if at least one foam material, foam material section or foam material element of a joint-sealing strip, as it is the object of EP 2 112 292 A2, is equipped, according to the invention, with the intumescent material. The disclosure content of EP 2 112 292 A2 is incorporated into this application, by means of an explicit reference, as belonging to the object of the present application.

It can be advantageous if at least one foam material, foam material section or foam material element of a joint-sealing strip, as it is the object of EP 2 784 231 A1, is equipped, according to the invention, with the intumescent material. The disclosure content of EP 2 784 231 A2 is incorporated into this application, by means of an explicit reference, as belonging to the object of the present application.

It can be advantageous if at least one foam material, foam material section or foam material element of a joint-sealing strip, as it is the object of EP 2 420 631 A2, is equipped, according to the invention, with the intumescent material. The disclosure content of EP 2 420 631 A2 is incorporated into this application, by means of an explicit reference, as belonging to the object of the present application. It can be particularly advantageous if the insertion part mentioned in EP 1 811 111 A2 is equipped, according to the invention, with the intumescent material.

It can be advantageous if at least one foam material, foam material section or foam material element of a joint-sealing strip, as it is the object of EP 2 354 410 A2, is equipped, according to the invention, with the intumescent material. The disclosure content of EP 2 354 410 A2 is incorporated into this application, by means of an explicit reference, as belonging to the object of the present application. It can be particularly advantageous if at least one of the foam material strips mentioned in EP 2 354 410 A2 is equipped, according to the invention, with the intumescent material.

It can be advantageous if at least one foam material, foam material section or foam material element of a joint-sealing strip, as it is the object of EP 2 065 548 A2, is equipped, according to the invention, with the intumescent material. The disclosure content of EP 2 065 548 A2 is incorporated into this application, by means of an explicit reference, as belonging to the object of the present application. It can be particularly advantageous if at least one of the foam material strips mentioned in EP 2 065 548 A2 is equipped, according to the invention, with the intumescent material.

It can be advantageous if at least one foam material, foam material section or foam material element of a joint-sealing strip, as it is the object of WO 94/20701 A1, is equipped, according to the invention, with the intumescent material. The disclosure content of WO 94/20701 A1 is incorporated into this application, by means of an explicit reference, as belonging to the object of the present application. It can be particularly advantageous if at least one of the foam material sections mentioned in WO 94/20701 A1, forming longitudinal edge regions, is equipped, according to the invention, with the intumescent material.

It can be advantageous if at least one foam material, foam material section or foam material element of a joint-sealing strip, as it is the object of EP 2 982 821 A1, is equipped, according to the invention, with the intumescent material. The disclosure content of EP 2 982 821 A1 is incorporated into this application, by means of an explicit reference, as belonging to the object of the present application. It can be particularly advantageous if the foam material body mentioned in EP 2 982 821 A1 is equipped, accordingly, non-uniformly with the intumescent material, according to the invention.

It can be advantageous if at least one foam material, foam material section or foam material element of a joint-sealing strip, as it is the object of EP 2 107 176 A1, is equipped, according to the invention, with the intumescent material. The disclosure content of EP 2 107 176 A1 is incorporated into this application, by means of an explicit reference, as belonging to the object of the present application. It can be particularly advantageous if a coating provided, in EP 2 107 176 A1, on at least one side surface of the sealing strip roll, is equipped, according to the invention, with the intumescent material.

It can be advantageous if at least one foam material, foam material section or foam material element of a joint-sealing strip, as it is the object of EP 2 415 942 A1, is equipped, according to the invention, with the intumescent material. The disclosure content of EP 2 415 942 A1 is incorporated into this application, by means of an explicit reference, as belonging to the object of the present application. It can be particularly advantageous if at least one of the foam material strips mentioned in EP 2 415 942 A1 is equipped, according to the invention, with the intumescent material.

It can be advantageous if at least one foam material, foam material section or foam material element of a joint-sealing strip, as it is the object of EP 2 990 575 A1, is equipped, according to the invention, with the intumescent material. The disclosure content of EP 2 990 575 A1 is incorporated into this application, by means of an explicit reference, as belonging to the object of the present application. It can be particularly advantageous if at least one of the foam material strips mentioned in EP 2 990 575 A1 is equipped, according to the invention, with the intumescent material.

The foam material of a joint-sealing strip can be subdivided into multiple foam material sections or foam material elements. The subdivision can result, for example, from at least one inner fire-protection layer that is present in the foam material and/or from at least one moisture-variable membrane layer that is present in the foam material, or from a differing height profile. It can be advantageous if one or more than one foam material section or foam material element is equipped with the intumescent material, according to the invention.

It can be advantageous if multiple sealing regions are provided within a joint-sealing strip.

It can be advantageous if at least two foam material sections have different densities.

It can be practical if the foam material or at least one or every foam material section is a polyurethane foam material, preferably a polyurethane soft foam material. This material recovers particularly well after pre-compression, within the joint, and ensures a long-lasting seal.

It can be advantageous if the foam material or at least one or every foam material section or one or every foam material element has one or multiple functional regions, preferably a first region that is sealed, toward the outside, against driving rain, a second heat-insulating as well as noise-reducing region, and a third region that is air-tight toward the inside.

It can be practical if the joint-sealing strip is compressible, preferably pre-compressed.

It is advantageous if the joint-sealing strip can be pre-compressed in the form of a roll and has delayed recovery.

Preferably, the thickness of the joint-sealing strip in the non-compressed state is between 10 mm and 100 mm, preferably between 18 mm to 60 mm.

It can be advantageous if the joint-sealing strip can be used for sealing joints between building components in house construction that are joined together, in particular between wall openings in an exterior wall and window frames or door frames, preferably without the use of additional joint strips or back filler materials.

It can be advantageous if the joint-sealing strip can be used to seal joints in a thermal insulation system.

It can be advantageous if the joint-sealing strip can be used for sealing joints in or on a pre-wall installation frame.

It can be advantageous if the joint-sealing strip is configured to be self-adhesive on one side. This side can be coated over its full area, with a self-adhesive layer, or not over its full area, with one or more than one self-adhesive web, which is preferably covered up with a releasable silicone paper.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
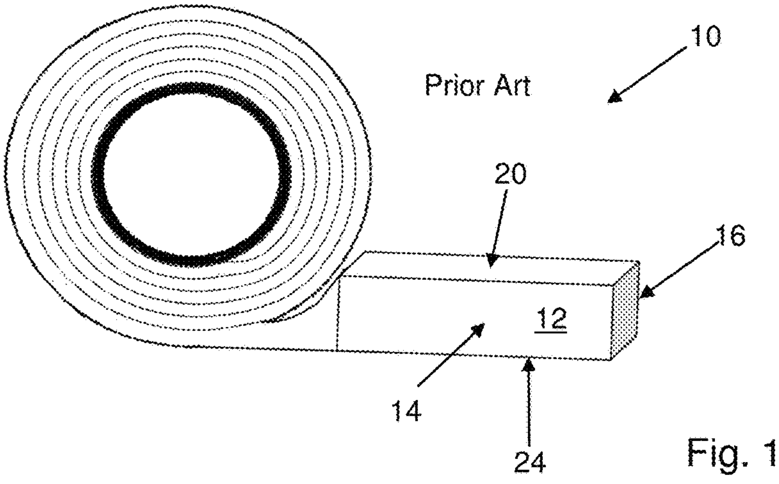
FIG. 1 shows a schematic representation of a joint-sealing strip according to the state of the art, kept on hand in the form of a roll and pre-compressed, in a side view, with a section that has already been unrolled and set back, in a perspective view, wherein the joint-sealing strip has a foam material.

FIG. 1 shows a schematic representation of a first joint-sealing strip 10, kept on hand in the form of a roll and pre-compressed, in a side view, with a section that has already been unrolled and set back, in a perspective view, wherein the joint-sealing strip 10 has a foam material 12. The joint-sealing strip 10 has two longitudinal sides 14, 16, as well as a top side 20 that borders on the one joint flank in the installed state of the joint-sealing strip 10, and an underside 24 that borders on the opposite joint flank in the installed state of the joint-sealing strip 10. This general structure of the joint-sealing strip 10 is the state of the art. The joint flank 18, against which the top side 20 of the joint-sealing strip 10 lies, and the joint flank 22, against which the underside 24 of the joint-sealing strip 10 lies, are shown schematically only in the variants a) and b) shown in FIG. 2, and left out in the other figures, for the sake of better clarity. It is understood that these joint flanks are present in the installed state of the joint-sealing strip 10.

The joint-sealing strip 10 according to the invention comprises a foam material 12 and has two longitudinal sides 14, 16 as well as a top side 20 that borders on the one joint flank 18 in the installed state of the joint-sealing strip 10, and an underside 24 that borders on the opposite joint flank 22 in the installed state of the joint-sealing strip 10, wherein the foam material 12, over a predetermined region, has an outer fire-protection layer 26 that has an intumescent material, and/or, over a predetermined region, has an inner fire-protection layer 28 that has an intumescent material, and/or wherein the foam material 12 is a foam material 12 that has been foamed with an intumescent material.

Figure 2:
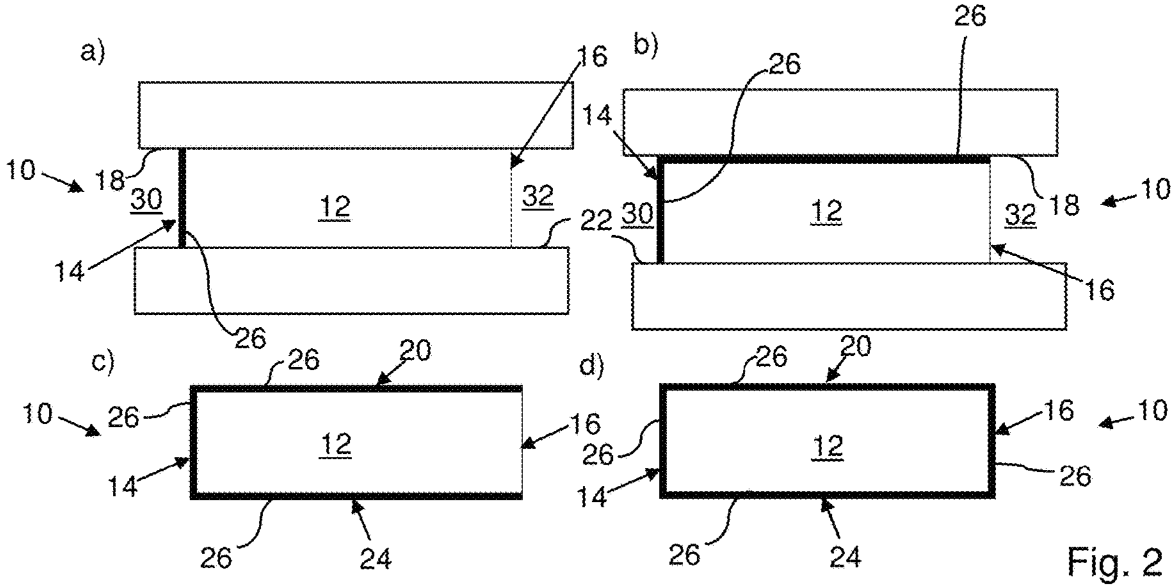
FIGS. 2-25 show, in a schematic representation, four variants a) to d), respectively, of a joint-sealing strip according to the invention.

FIG. 2 shows a joint-sealing strip 10, in which in a) only the longitudinal side 14 that faces the exterior 30 has an outer fire-protection layer 26, in b) in addition, the top side 20 that lies against the joint flank 18 has an outer fire-protection layer 26, in c) in addition, the underside 24 that lies against the joint flank 22 has an outer fire-protection layer 26, and in d) in addition, the longitudinal side 14 that faces the interior 32 has an outer fire-protection layer 26.

The predetermined region of the outer fire-protection layer 26 relates, in all the variants a)-d) shown in FIG. 2, in each instance, to the complete surface of the side having the corresponding outer fire-protection layer 26, and thereby not just to a partial region of the corresponding side. Nevertheless, the outer fire-protection layer 26 provided does not—as shown in FIGS. 2-26—have to be free of gaps, but rather can—as is also true for the inner fire-protection layer 28, by the way—be composed, in each instance, of a cohesive surface with or without gaps and/or of multiple non-cohesive surfaces with or without gaps.

Figure 3:
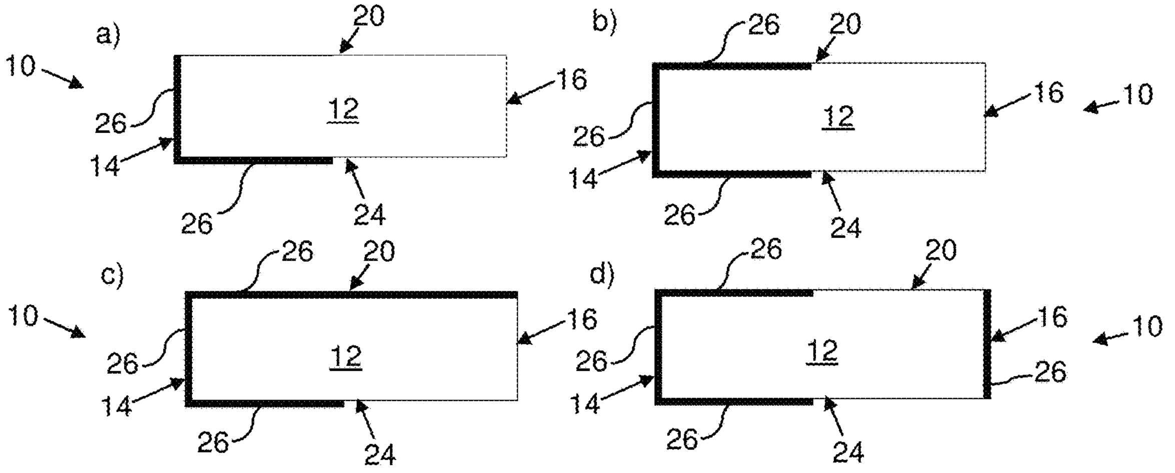

The variants a) to d) of the joint-sealing strip 10 shown in FIG. 3 only have outer fire-protection layers 26, wherein the outer fire-protection layers 26 also relate to a partial surface of the underside 24, as shown in variants a), c) and d) of FIG. 3, or a partial surface of the top side 20, as shown in variants b) and c) of FIG. 3. In all the variants a) to d) of FIG. 3, the complete surface of the longitudinal side 14 that faces the exterior 30 is provided with an outer fire-protection layer 26. In addition, for one thing, in variant d) of FIG. 3, the complete surface of the longitudinal side 16 that faces the interior 32 is provided with an outer fire-protection layer 26, and for another thing, in variant b) of FIG. 3 the complete surface of the top side 20 that faces the joint flank 18 is provided with an outer fire-protection layer 26.

Figure 4:
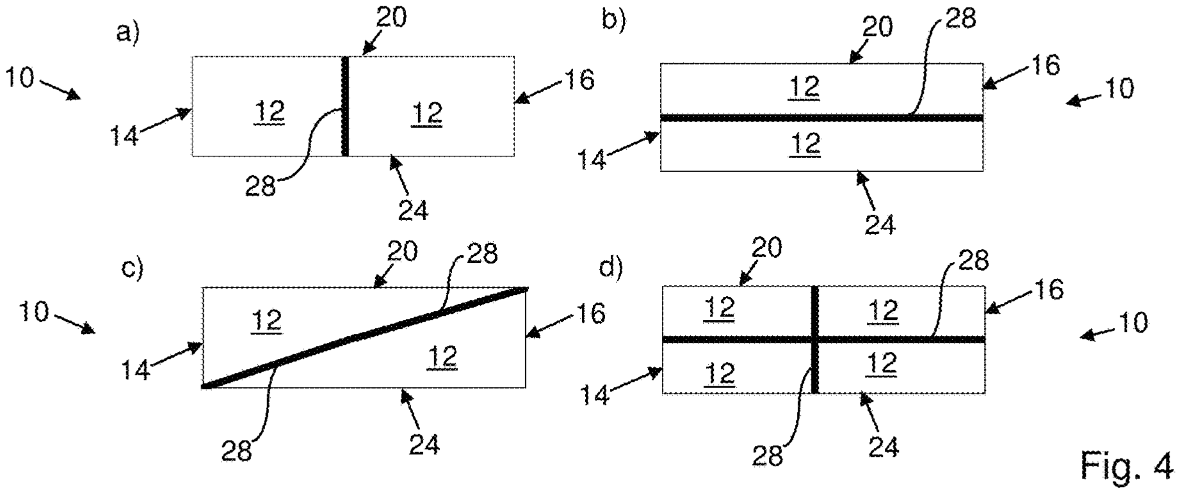

FIG. 4 shows, in variants a) to d), in each instance, a joint-sealing strip 10 according to the invention, which has, in each instance, as shown in variants a) to c), only an inner fire-protection layer 28, or, as shown in variant d) of FIG. 4, two intersecting inner fire-protection layers 28. All the inner fire-protection layers 28 run centrally through the center longitudinal axis of the joint-sealing strip 10, specifically, in each instance, between two opposite longitudinal sides 14, 16 and parallel to the top side and underside 20, 24, as shown in variants b) and d), or between the top side 20 and the underside 24 and parallel to the longitudinal sides 14, 16, as shown in variants a) and d). In variant c), the inner fire-protection layer 28 runs from the edge that extends between the underside 24 and the longitudinal side 14 that faces the exterior 30, to the edge that extends between the top side 20 and the longitudinal side 16 that faces the interior 32. The inner fire-protection layer 28 therefore runs quasi diagonally within the foam material 12 of the joint-sealing strip 10. The inner fire-protection layers 28 divide the foam material 12, in variants a) to c) of FIG. 4, into two foam material sections 12, and, in variant d), actually into four foam material sections 12.

Figure 5:
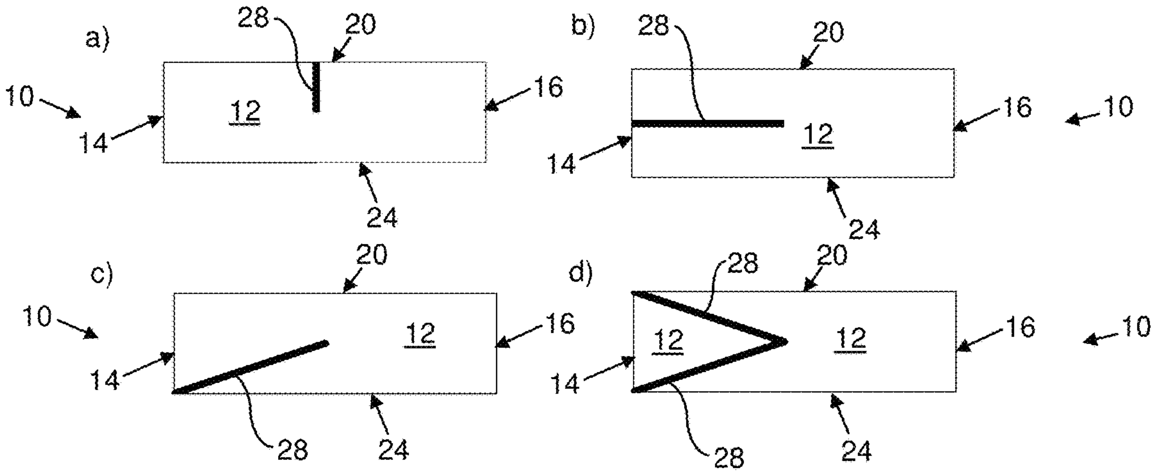

A further joint-sealing strip 10 according to the invention once again has, in the variants a) to d) shown in FIG. 5, only inner fire-protection layers 28, which end, however, in contrast to the inner fire-protection layers 28 shown in FIG. 4, quasi like incisions at the center longitudinal axis of the joint-sealing strip 10, and thereby do not run completely between the longitudinal sides 14, 16 that lie opposite one another or between the top side 20 and the underside 24 or between edges that lie diametrically opposite one another. The predetermined region of the inner fire-protection layer 28 that runs within the foam material 12 is therefore shorter, accordingly.

Figure 6:
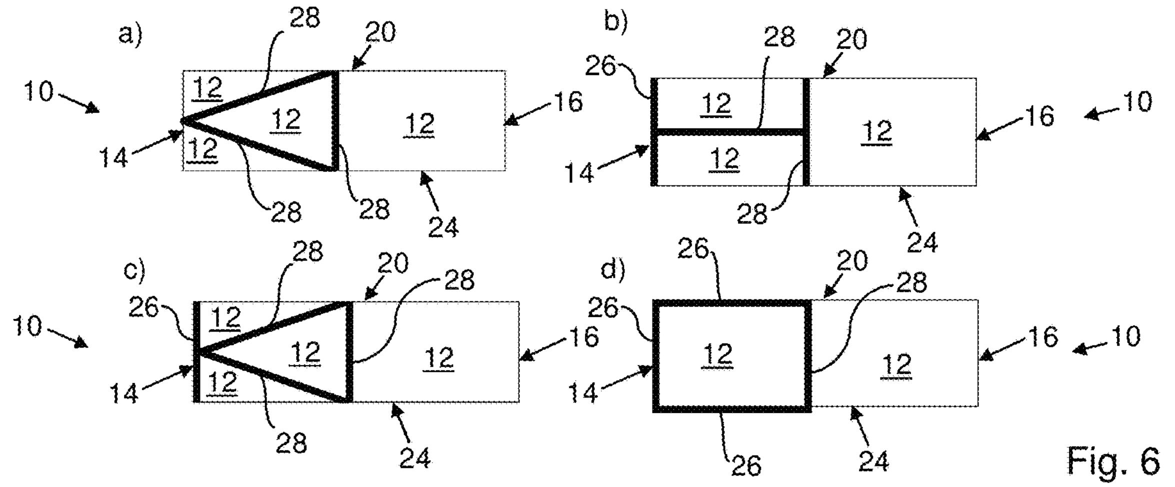

FIG. 6 makes it clear, in variants a) to d), what geometries can result from different combinations of outer fire-protection layers 26 with inner fire-protection layers 28, which combinations can be advantageous, in different ways, depending on the purpose of use of the joint-sealing strip 10.

Figure 7:
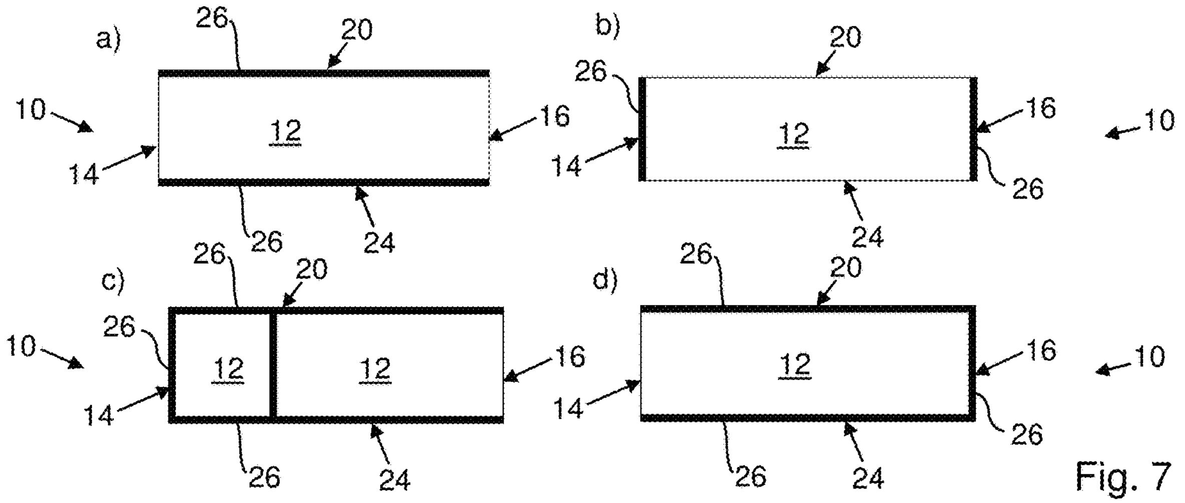
Figure 8:
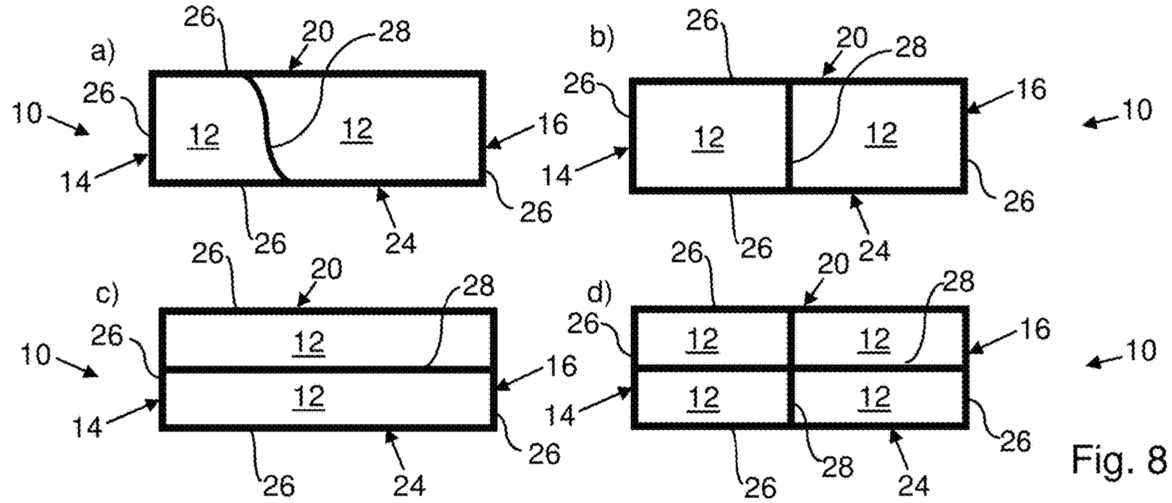

In FIGS. 7 and 8, further joint-sealing strips 10 are shown, which show different combinations of outer fire-protection layers 26 only, but also different combinations of outer fire-protection layers 26 with inner fire-protection layers 28. As an example, variant a) of the joint-sealing strip 10 shown in FIG. 8 should be emphasized. The inner fire-protection layer 28 shown there runs in a curve and decentralized between the top side 20 and the underside 24 of the joint-sealing strip 10. The inner fire-protection layer 28 therefore does not run through the center longitudinal axis of the joint-sealing strip 10. Such a geometry can also be advantageous, depending on the purpose of use of the joint-sealing strip 10.

Figure 9:
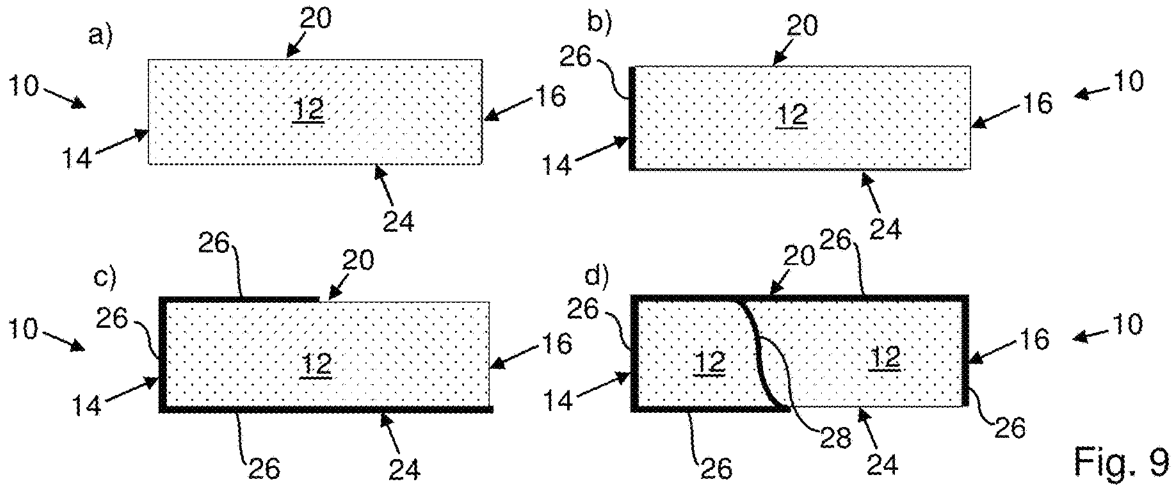
Figure 10:
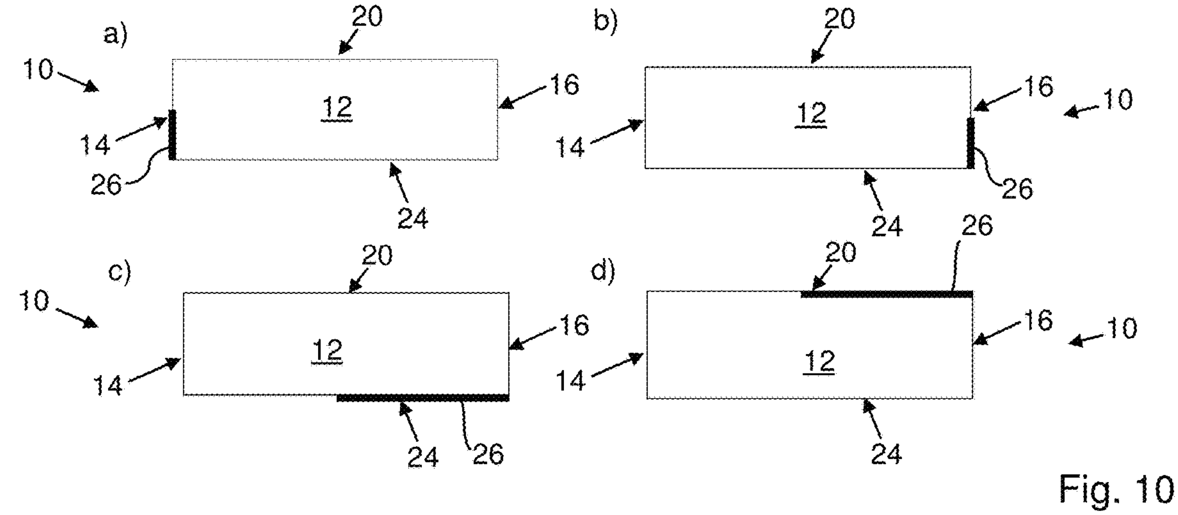
Figure 11:
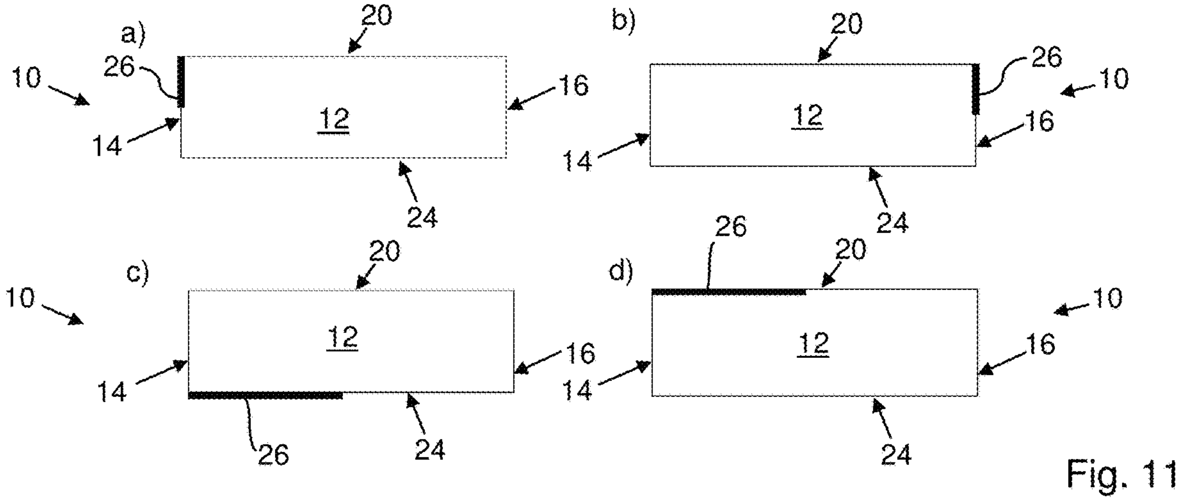
Figure 12:
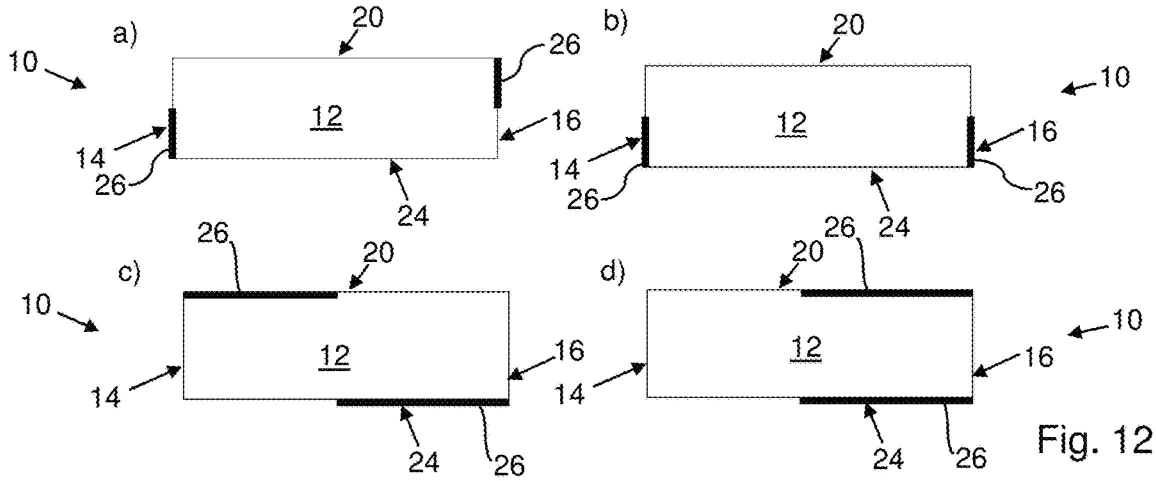
Figure 13:
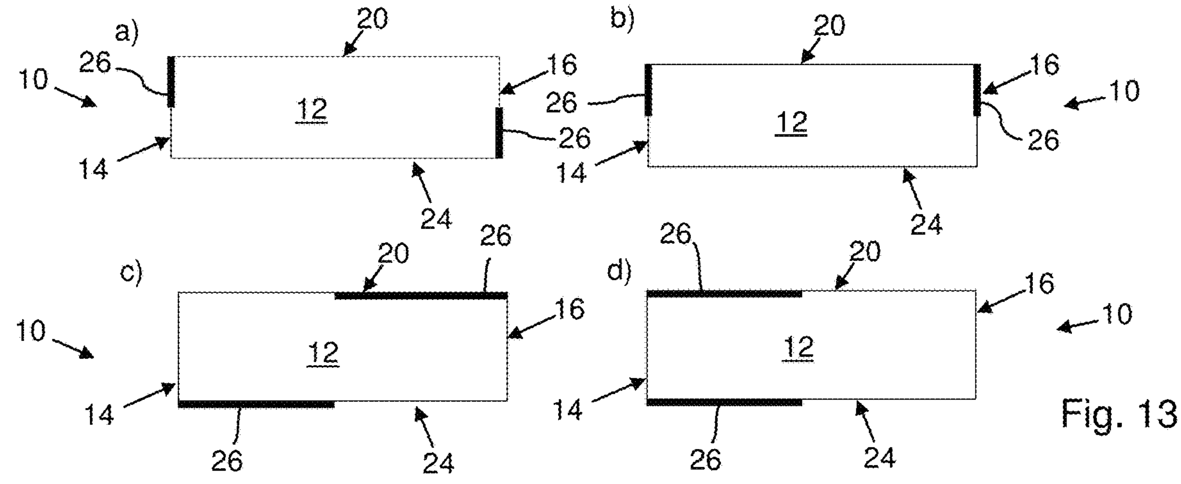
Figure 14:
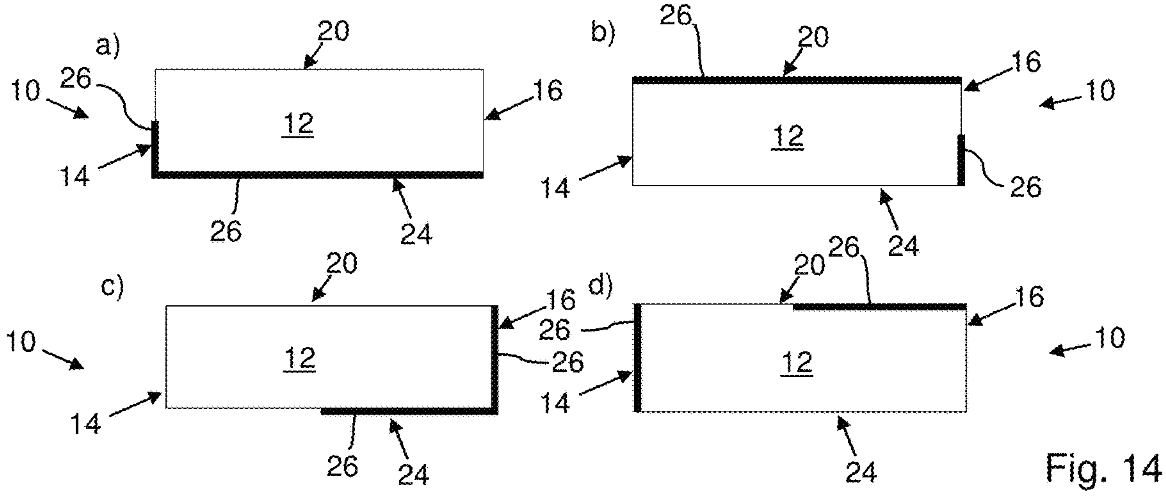
Figure 15:
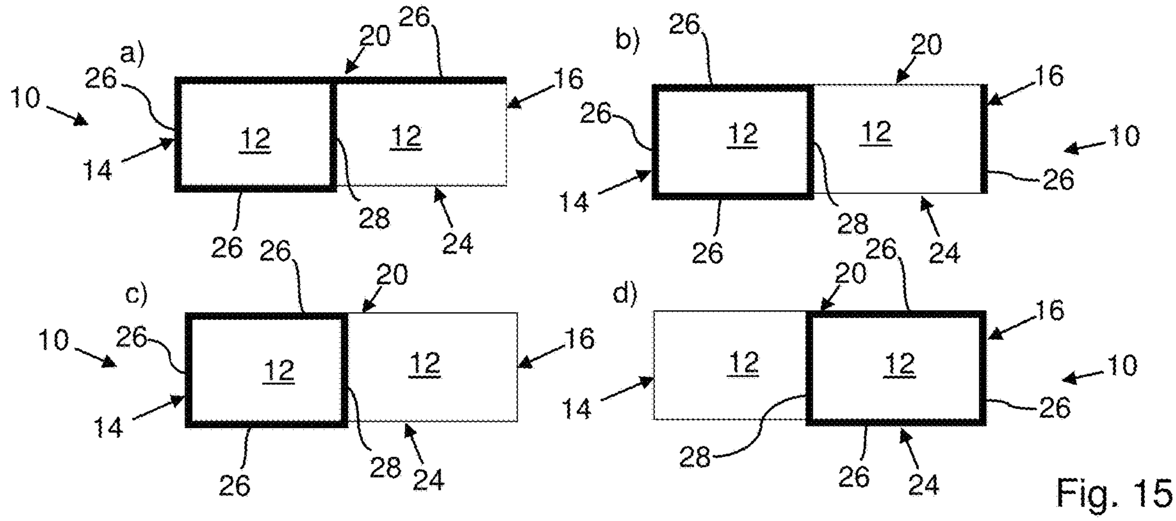
Figure 16:
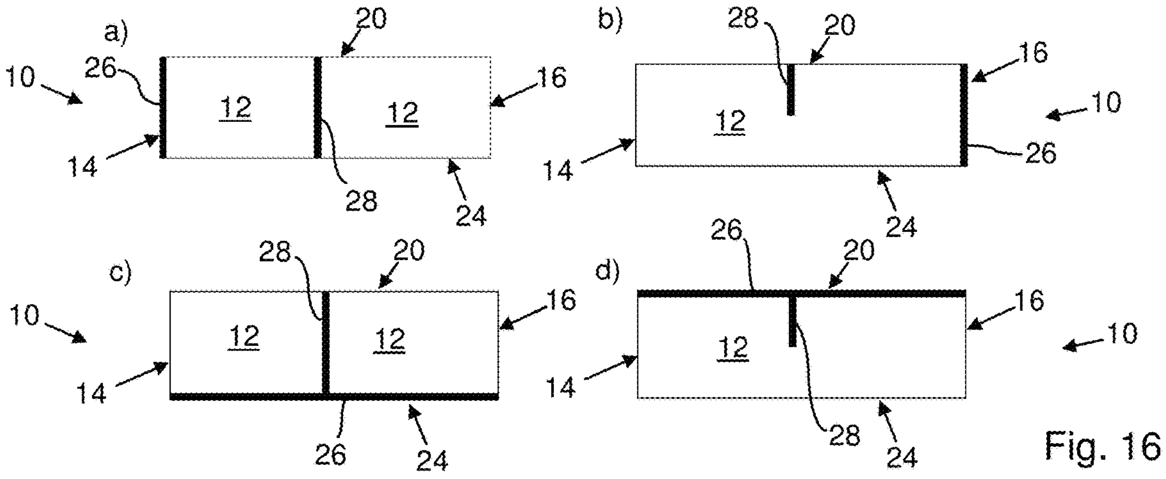
Figure 17:
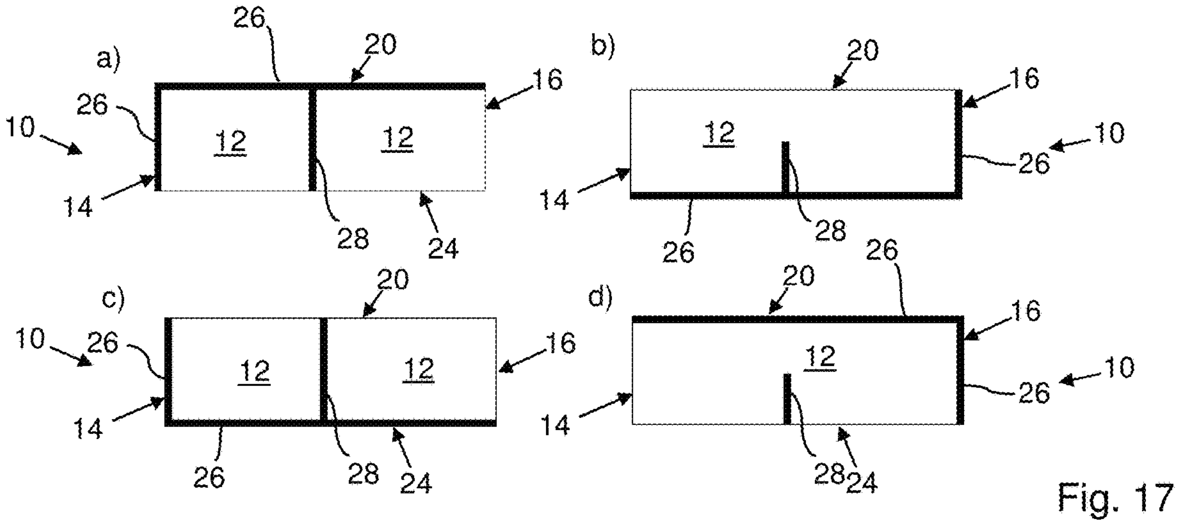
Figure 18:
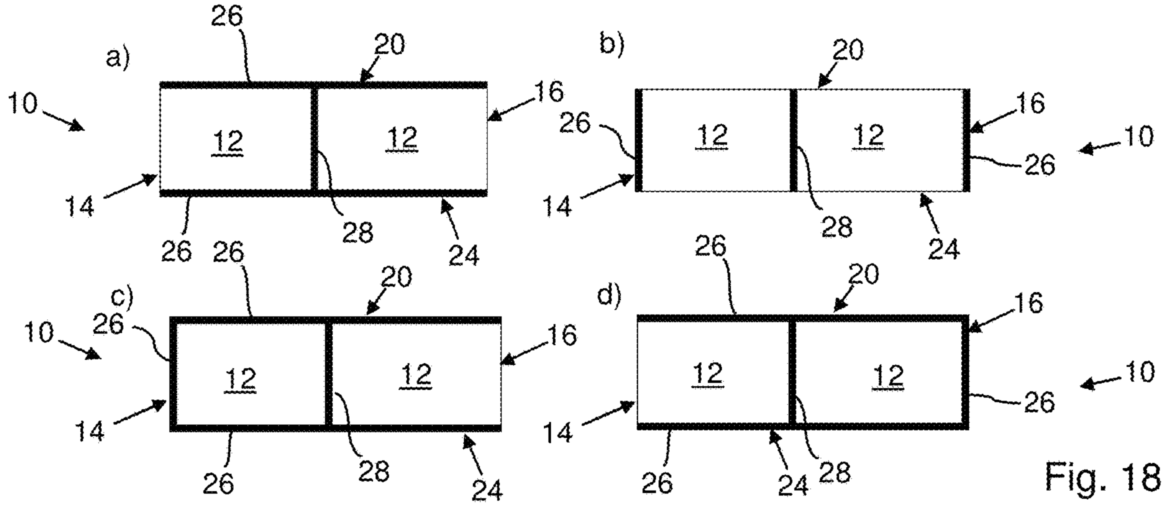

FIG. 9 shows, in variant a), a joint-sealing strip 10, the foam material 12 of which is a foam material 12 that has been foamed with an intumescent material. Variants b) to d) of FIG. 9 show advantageous combination possibilities of the foam material 12 that has been foamed with an intumescent material, with outer fire-protection layers 28 and inner fire-protection layers 28.

FIGS. 10 to 24 each show further variants a) to d) of a joint-sealing strip according to the invention, which are easily understood in and of themselves, with different combinations, which are advantageous as a function of their use, of outer fire-protection layers 26 and/or inner fire-protection layers 28.

Figure 19:
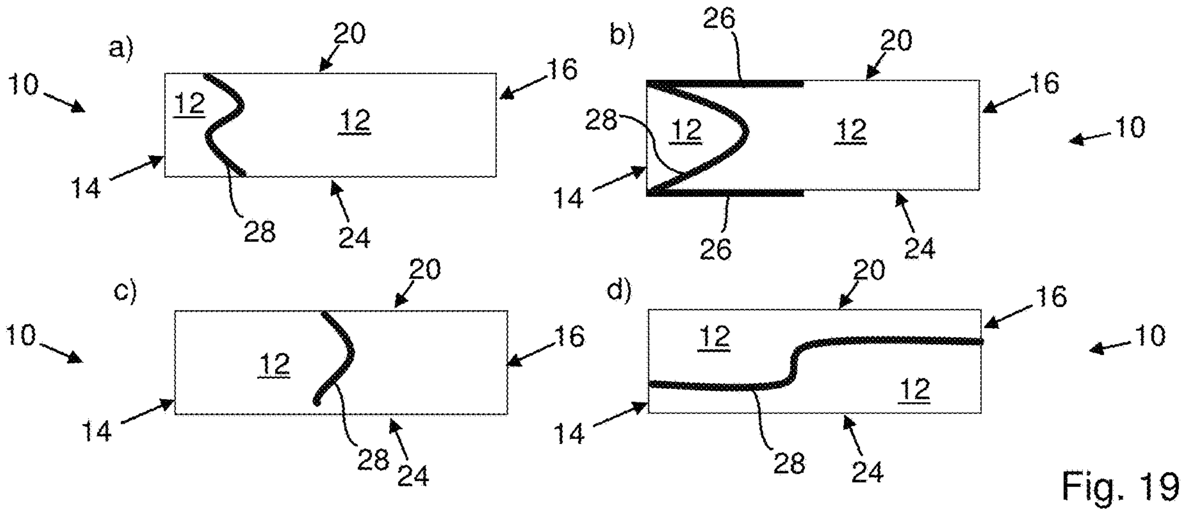
Figure 20:
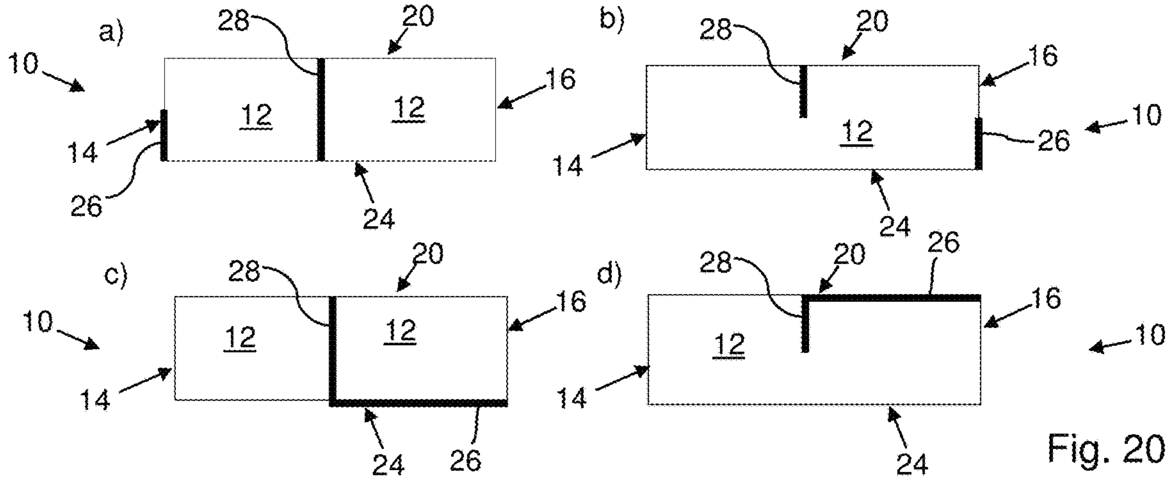
Figure 21:
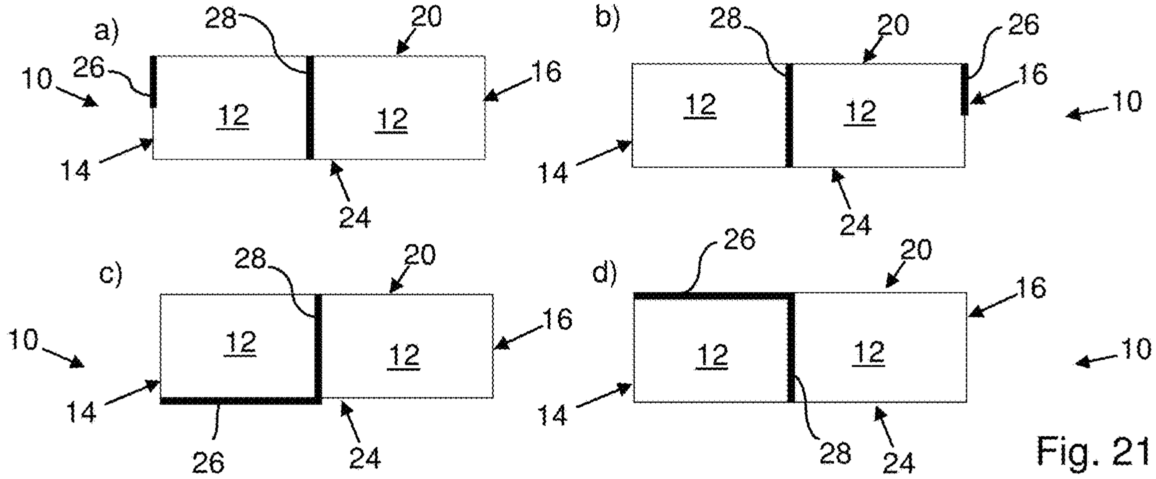
Figure 22:
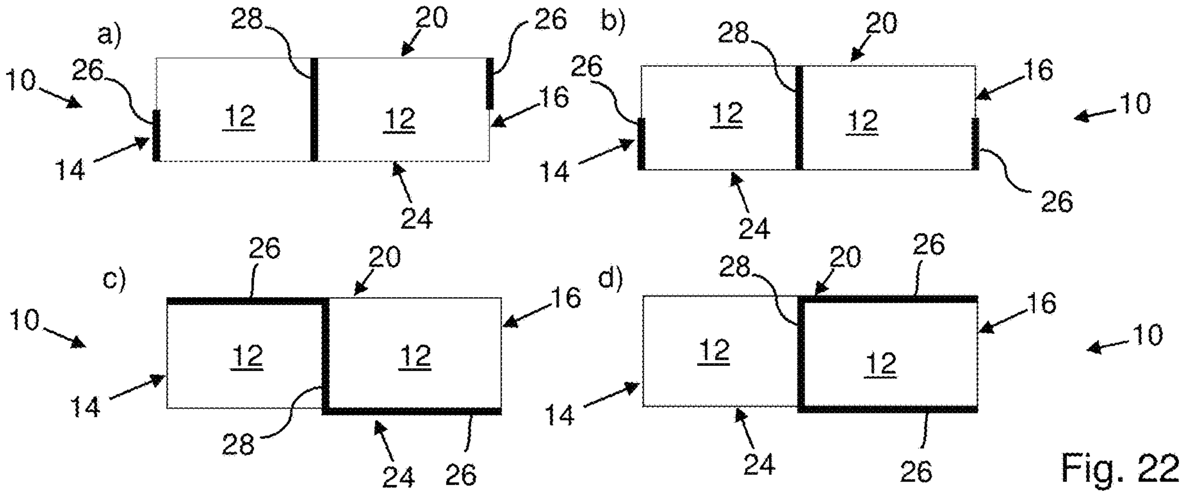
Figure 23:
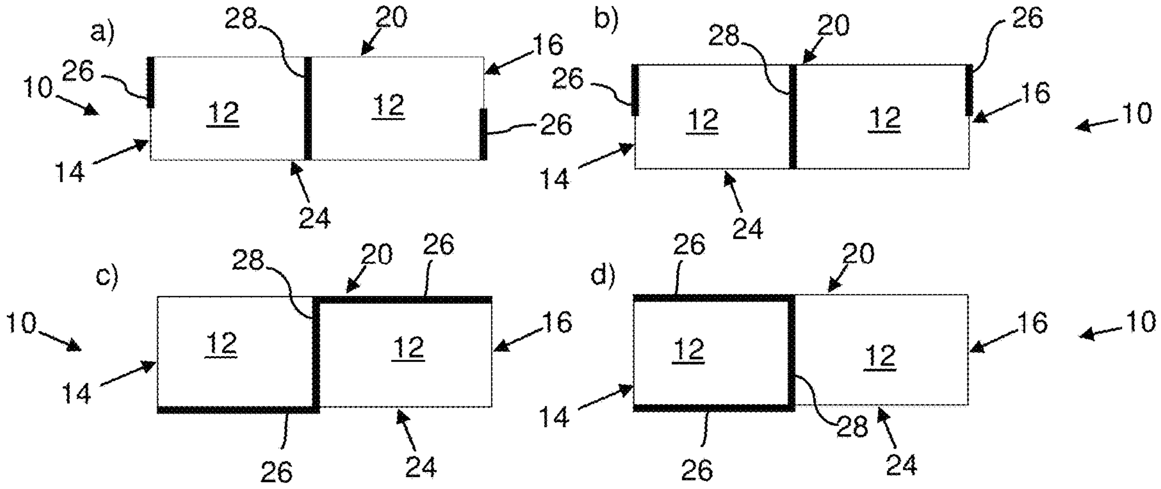
Figure 24:
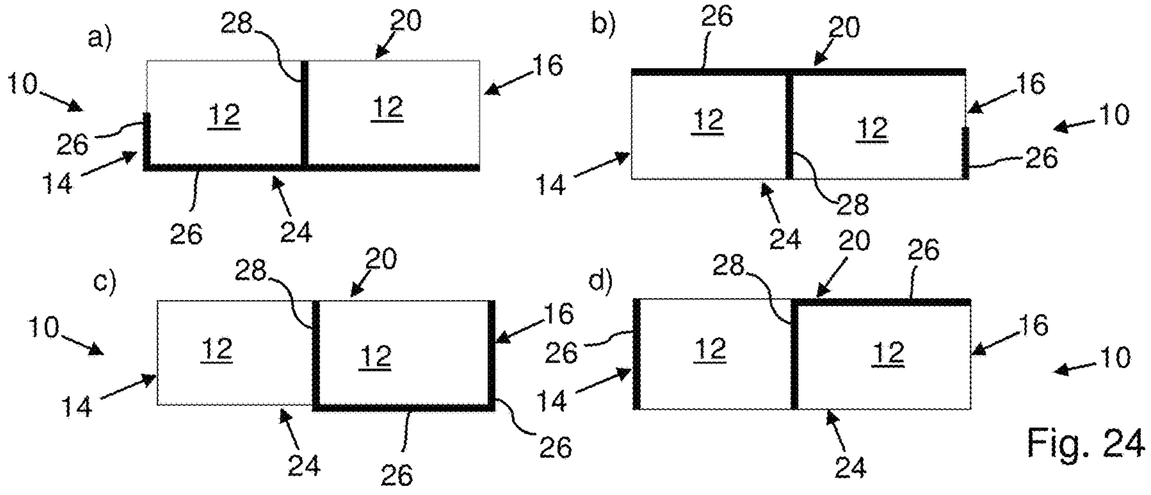

In FIG. 19, variant a) of the joint-sealing strip 10 shows an inner fire-protection layer 28, which extends in a curve and decentrally between the top side 20 and the underside 24, within the foam material 12. Variant d) of the joint-sealing strip 10 shown in FIG. 19 shows an inner fire-protection layer 28, which extends in a curve and relatively centrally between the longitudinal sides 14, 16, within the foam material 12. Variant b) of FIG. 19 is a combination of two outer fire-protection layers 26 arranged on the top side 20 and the underside 24, with an inner fire-protection layer 28 that runs in a curve within the foam material 12, wherein the outer fire-protection layers 26 make a transition into the inner fire-protection layer 28. The arrangement of the aforementioned fire-protection layers 26, 28 is in a region of the joint-sealing strip 10 that lies closer to the exterior 30 than to the interior 32.

Figure 25:
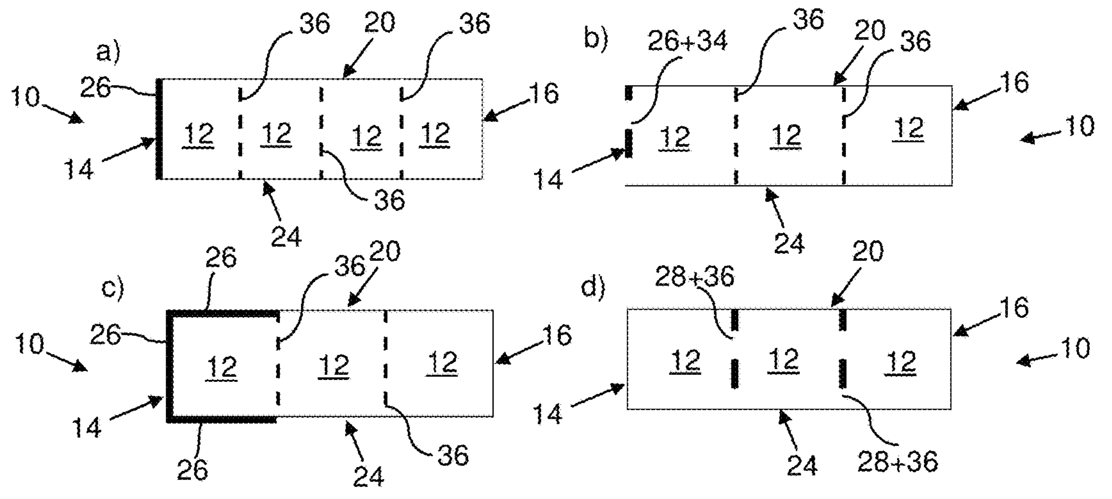
Figure 26:
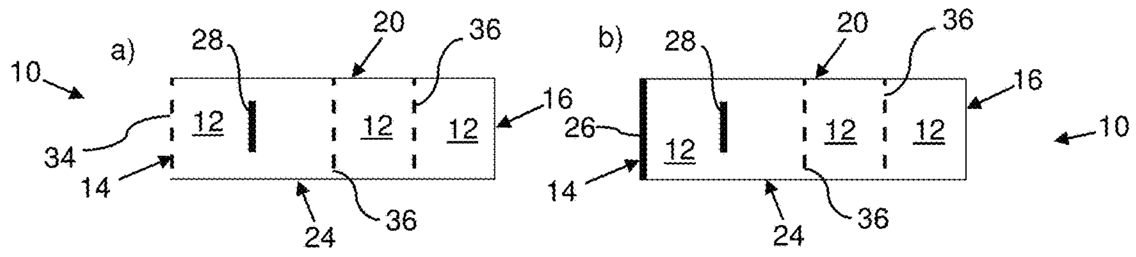
FIG. 26 shows, in a schematic representation, two variants a) and b) of a joint-sealing strip according to the invention.

The variants of a joint-sealing strip 10 according to the invention shown in FIGS. 25 and 26 have, over a predetermined region of the foam material 12, multiple moisture-variable inner membrane layers 36, which are arranged transverse to a water vapor diffusion direction. In variants a) to c) of FIG. 25 as well as variants a) and b) of FIG. 26, this involves moisture-variable inner membrane layers 36, as they are known from the state of the art. These are, according to the invention, combined with at least one outer fire-protection layer 26, as shown in variant a) and c) of FIG. 25 as well as variant b) of FIG. 26, and/or with at least one inner fire-protection layer 28, as shown in variants a) and b) of FIG. 26. Furthermore, as shown in variant a) of FIG. 26, it is advantageous that an additional combination of a moisture-variable outer membrane layer 34 is also possible.

In exceptional cases, it can also be advantageous if the outer fire-protection layer 26 is such that it also forms the moisture-variable outer membrane layer 34, as shown in variant b) of FIG. 26, or that the inner fire-protection layer 28 is such that it also forms the moisture-variable inner membrane layer 36, as shown in variant d) of FIG. 25.

Figure 27:
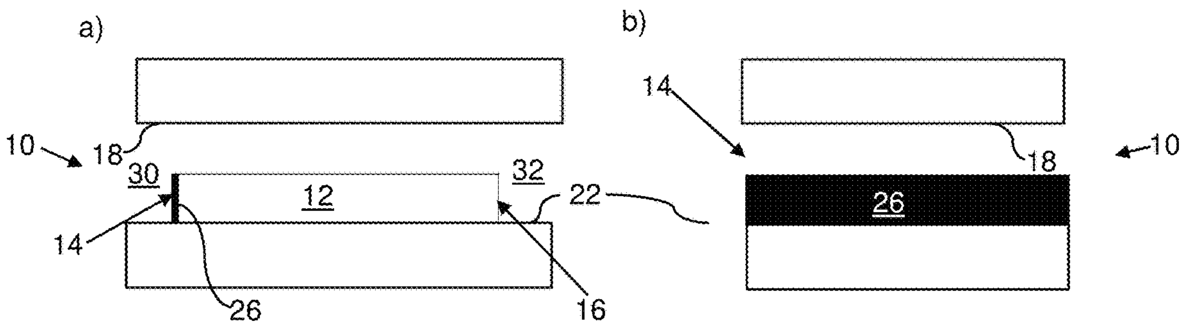
FIG. 27 shows, in a schematic representation, a variant of a joint-sealing strip according to the invention, arranged between two joint flanks, but not yet expanded according to the invention, a) in cross-section, and b) with a view onto the longitudinal side that faces the exterior and is provided with a continuous outer fire-protection layer 26.
Figure 28:
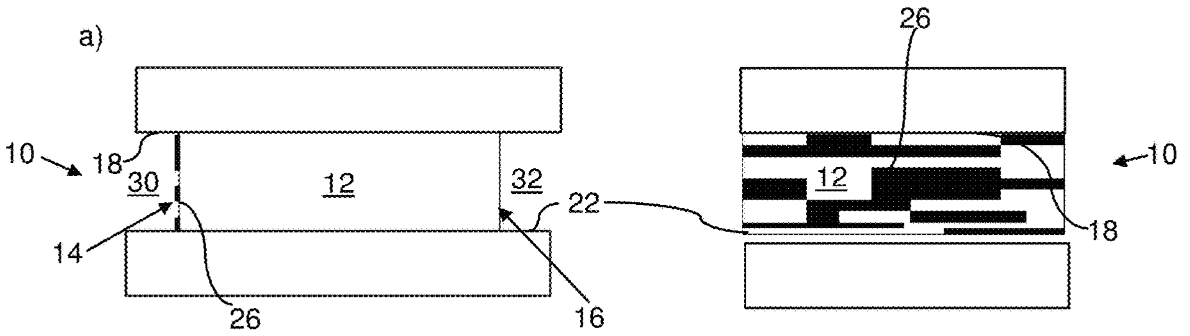
FIG. 28 shows, in a schematic representation, the variant of the joint-sealing strip shown in FIG. 28, arranged between two joint flanks but, in the meantime, expanded according to the invention, a) in cross-section, and b) with a view onto the longitudinal side that faces the exterior and is provided with an outer fire-protection layer 26 that is configured with gaps.

FIGS. 27 and 28 show a further exemplary embodiment. FIG. 27 shows, in a schematic representation, a joint-sealing strip 10 according to the invention, arranged between two joint flanks 18, 22, but not yet expanded, a) in cross-section and b) with a view onto the longitudinal side 14 that faces the exterior 30 and is provided with a continuous outer fire-protection layer 26. FIG. 28 shows, in a schematic representation, the same joint-sealing strip 10 according to the invention, arranged between the joint flanks 18, 22, but in the meantime having been expanded, a) in cross-section and b) with a view onto the longitudinal side 14 that faces the exterior 30 and is provided with an outer fire-protection layer 26 configured with gaps. In FIG. 27, the outer fire-protection layer 26 is therefore applied as a continuous outer fire-protection layer 26, in other words one having no gaps, completely on the longitudinal side 14 of the compressed joint-sealing strip, specifically in such a manner that this outer fire-protection layer 26 breaks up during or after expansion of the joint-sealing strip 10 between the joint flanks 18, 22, so that finally, gaps (FIG. 28) have formed in the surface of the outer fire-protection layer 26 (FIG. 27), which was previously cohesive without gaps, in the installed state of the expanded joint-sealing strip 10.

Figure 29:
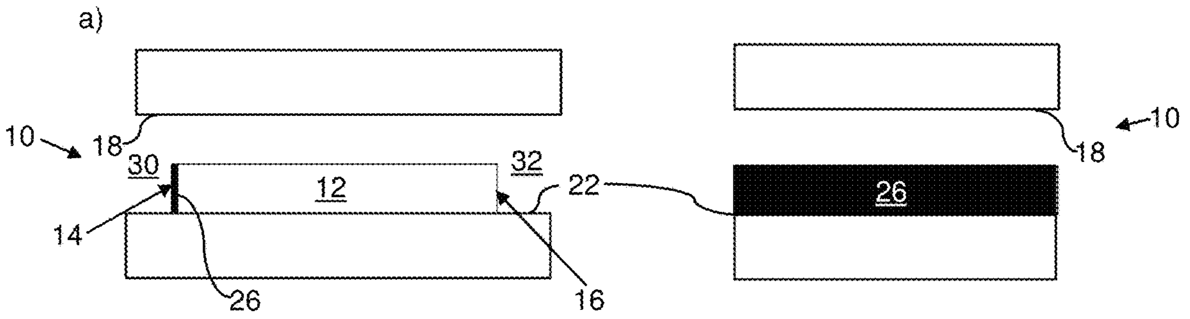
FIG. 29 shows, in a schematic representation, a further variant of a joint-sealing strip according to the invention, arranged between two joint flanks, but not yet expanded, a) in cross-section and b) with a view onto the longitudinal side that faces the exterior and is provided with a continuous outer fire-protection layer.
Figure 30:
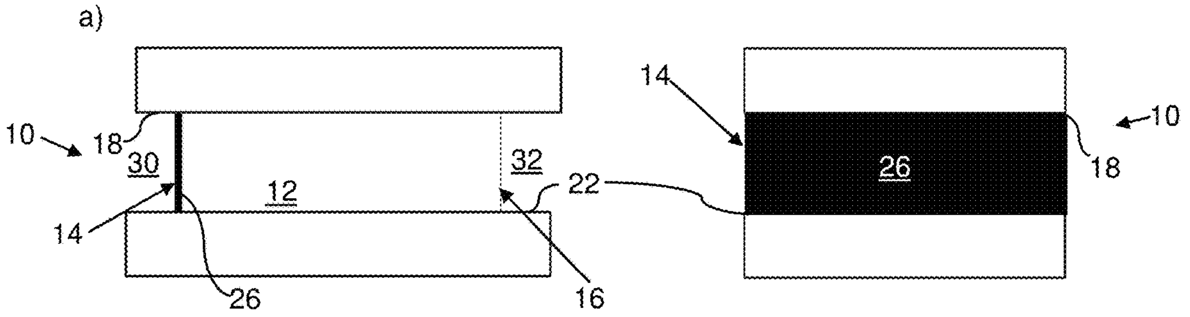
FIG. 30 shows, in a schematic representation, the variant of the joint-sealing strip shown in FIG. 29, arranged between two joint flanks, but expanded here, according to the invention, a) in cross-section and b) with a view onto the longitudinal side that faces the exterior and is provided with a continuous outer fire-protection layer 26.

FIGS. 29 and 30 show a further exemplary embodiment. FIG. 29 shows, in a schematic representation, a joint-sealing strip 10 according to the invention, arranged between two joint flanks 18, 22, but not yet expanded, a) in cross-section and b) with a view onto the longitudinal side 14 that faces the exterior 30 and is provided with a continuous outer fire-protection layer 26. FIG. 30 shows, in a schematic representation, the same joint-sealing strip 10 according to the invention, arranged between the joint flanks 18, 22, but in the meantime expanded, a) in cross-section and b) with a view onto the longitudinal side 14 that faces the exterior 30 and is furthermore provided with a continuous outer fire-protection layer 26. In FIG. 29, therefore, the outer fire-protection layer 26 is applied as a continuous outer fire-protection layer 26, in other words one not having any gaps, completely onto the longitudinal side 14 of the compressed joint-sealing strip, specifically in such a manner that this outer fire-protection layer 26 continues to remain, during or after expansion of the joint-sealing strip 10 between the joint flanks 18, 22, as a continuous outer fire-protection layer 26, in other words one not having any gaps, completely on the longitudinal side 14 of the compressed joint-sealing strip 10. The surface of the outer fire-protection layer 26 (FIG. 29), which was previously cohesive without gaps, is maintained in the installed state of the expanded joint-sealing strip 10 (FIG. 30).

Although only a few embodiments of the present invention have been shown and described, it is to be understood that many changes and modifications may be made thereunto without departing from the spirit and scope of the invention.

REFERENCE SYMBOL LIST

10 joint-sealing strip
12 foam material
14 longitudinal side
16 longitudinal side
18 joint flank
20 top side
22 joint flank
24 underside
26 outer fire-protection layer
28 inner fire-protection layer
30 exterior
32 interior
34 outer membrane layer
36 inner membrane layer

What is claimed is:

1. A joint-sealing strip (10) comprising a foam material (12), having two longitudinal sides (14, 16), a top side (20) configured to border a first joint flank (18) in an installed state of the joint-sealing strip (10), and an underside (24) configured to border an opposite second joint flank (22) in the installed state, wherein the foam material (12) comprises, over a predetermined region, an outer fire-protection layer (26) on at least a portion of at least one longitudinal side (14, 16), the outer fire-protection layer (26) comprising a dried coating layer formed from a paste comprising (i) a binder and (ii) an intumescent material, wherein the joint-sealing strip (10) is compressible to a compressed state and expandible to the installed state, wherein, in the compressed state, the dried coating layer forms a continuous, gap-free surface over said portion, and wherein, in the installed state after expansion, the dried coating layer is fractured such that a plurality of gaps are present in the outer fire-protection layer (26).

2. The joint-sealing strip (10) according to claim 1, wherein the outer fire-protection layer (26) is arranged on the longitudinal side (14) of the foam material (12) that faces the exterior (30) in the installed state of the joint-sealing strip (10) and/or on the longitudinal side (16) of the foam material (12) that faces the interior (32) in the installed state of the joint-sealing strip (10).

3. The joint-sealing strip (10) according to claim 1, wherein at least one inner fire-protection layer (28) extends parallel to the longitudinal sides (14, 16) within the foam material (12) and/or wherein at least one inner fire-protection layer (28) extends parallel to the top side (20) and underside (24) within the foam material (12) and/or wherein at least one inner fire-protection layer (28) extends at a slant between the top side (20) and underside (24) within the foam material (12) and/or wherein at least one inner fire-protection layer (28) extends at a slant between the longitudinal sides (14, 16) within the foam material (12).

4. The joint-sealing strip (10) according to claim 3, wherein at least one inner fire-protection layer (28) is arranged centrally within the foam material (12) and/or wherein at least one inner fire-protection layer (28) is arranged decentrally within the foam material (12).

5. The joint-sealing strip (10) according to claim 3, wherein at least one inner fire-protection layer (28) extends on a curve between the top side (20) and underside (24) within the foam material (12) and/or wherein at least one inner fire-protection layer (28) extends on a curve between the longitudinal sides (14, 16) within the foam material (12).

6. The joint-sealing strip (10) according to claim 3, wherein the inner fire-protection layer (28) is a film into which the intumescent material is integrated, wherein the film is equipped to be adhesive on both sides.

7. The joint-sealing strip (10) according to claim 1, wherein the intumescent material is expandable graphite.

8. The joint-sealing strip (10) according to claim 7, wherein the expandable graphite has an expansion temperature of >140° C.

9. The joint-sealing strip (10) according to claim 7, wherein the expandable graphite has an expansion volume at 1000° C. of >50 $cm^3/g$.

10. The joint-sealing strip (10) according to claim 7, wherein the expandable graphite comprises one of the following expandable graphite types or of a mixture of a plurality of the following expandable graphite types, namely a) an expandable graphite type in which at least 50% of the particles have a particle size of >180 µm or
b) an expandable graphite type in which at least 50% of the particles have a particle size of <180 µm or
c) an expandable graphite type in which at least 50% of the particles have a particle size of <150 µm or
d) an expandable graphite type in which least 50% of the particles have a particle size of <75 µm or
e) an expandable graphite type in which at least 50% of the particles have a particle size of >300 µm or
f) an expandable graphite type in which at least 50% of the particles have a particle size of >500 µm.

11. The joint-sealing strip (10) according to claim 7, wherein the expandable graphite comprises a mixture of at least two of the following expandable graphite types, namely a) an expandable graphite type in which at least 50% of the particles have a particle size of >180 µm or
b) an expandable graphite type in which at least 50% the particles have a particle size <150 µm or
c) an expandable graphite type in which at least 50% of the particles have a particle size of >300 µm.

12. The joint-sealing strip (10) according to claim 3, wherein the outer fire-protection layer (26) is connected to the inner fire-protection layer (28).

13. The joint-sealing strip (10) according to claim 1, wherein the joint-sealing strip (10) is wound into a roll in the compressed state prior to applying the outer fire-protection layer (26).

14. The joint-sealing strip (10) according to claim 1, wherein the proportion of gaps in the surface provided with an outer fire-protection layer (26), in total, after partial or complete expansion of the joint-sealing strip (10), is 10 to 90%.

15. The joint-sealing strip (10) according to claim 1, wherein the foam material (12) has, over a predetermined region, at least one moisture-variable outer membrane layer (34) and/or, over a predetermined region, at least one moisture-variable inner membrane layer (36), wherein at least one of the outer membrane layer (34) and the inner membrane layer (36) is arranged, at least in part, transverse to a water vapor diffusion direction.

16. The joint-sealing strip (10) according to claim 1, wherein the foam material (12) is impregnated with an impregnation compound.

17. A method for the production of a joint-sealing strip, which comprises a foam material having two longitudinal sides as well as a top side that borders on a first joint flank in an installed state of the joint-sealing strip, and an underside that borders on an opposite second joint flank in the installed state of the joint-sealing strip, wherein the foam material is coated, over a predetermined region, with an outer fire-protection layer that has an intumescent material, wherein a paste that contains a binder and the intumescent material is applied, at least in certain regions, to the one and/or the other longitudinal side of the compressed foam material that has been wound up into a roll, and subsequently dried, wherein the resulting continuous layer, in other words one that has no gaps, breaks up during expansion of the joint-sealing strip in the joint, so that gaps are formed in the outer fire-protection layer.

* * * * *